(12) United States Patent (10) Patent No.: US 12,580,960 B2

Narayanaswamy (45) Date of Patent: Mar. 17, 2026

(54) METADATA-BASED DETECTION AND PREVENTION OF PHISHING ATTACKS

(71) Applicant: Netskope, Inc., Santa Clara, CA (US)

(72) Inventor: Krishna Narayanaswamy, Saratoga, CA (US)

(73) Assignee: Netskope, Inc., Santa Clara, CA (US)

( * ) Notice: Subject to any disclaimer, the term of this patent is extended or adjusted under 35 U.S.C. 154(b) by 185 days.

(21) Appl. No.: 18/502,895

(22) Filed: Nov. 6, 2023

(65) Prior Publication Data

US 2024/0073245 A1 Feb. 29, 2024

Related U.S. Application Data

(63) Continuation of application No. 17/157,947, filed on Jan. 25, 2021, now Pat. No. 11,856,022.

(Continued)

(51) Int. Cl.
*H04L 29/06* (2006.01)
*G06F 21/62* (2013.01)
(Continued)

(52) U.S. Cl.
CPC ...... *H04L 63/1483* (2013.01); *G06F 21/6245* (2013.01); *H04L 63/1425* (2013.01); *H04L 63/20* (2013.01); *H04L 67/02* (2013.01)

(58) Field of Classification Search
CPC .......... G06N 3/084; G06N 20/20; G06N 5/01; G06N 3/045; G06N 3/044; G06N 3/048;
(Continued)

(56) References Cited

U.S. PATENT DOCUMENTS

| | | | |
|---|---|---|---|
| 5,440,723 A | 8/1995 | Arnold et al. | |
| 6,513,122 B1 | 1/2003 | Magdych et al. | |

(Continued)

FOREIGN PATENT DOCUMENTS

| | | | | | |
|---|---|---|---|---|---|
| CN | 111147490 A | * | 5/2020 | ......... | H04L 63/1416 |
| EP | 1063833 A2 | | 12/2000 | | |

OTHER PUBLICATIONS

Martin, Victoria "Cooperative Security Fabric," The Fortinet Cookbook, Jun. 8, 2016, 6 pgs., archived Jul. 28, 2016 at https://web.archive.org/web/20160728170025/http://cookbook.fortinet.com/cooperative-security-fabric-54.

(Continued)

*Primary Examiner* — Tri M Tran

(57) ABSTRACT

The technology disclosed intercepts a webpage rendered by a server in response to a user action executed on a client. The technology disclosed analyzes one or more images of the webpage and determines that a particular hosted service is represented by the images. It analyzes one or more fields of the webpage and determines that the fields elicit confidential information. The technology disclosed intercepts a request generated by the client in response to another user action providing the confidential information via the fields. The technology disclosed analyses the request and determines that the confidential information is being exfiltrated to an unsanctioned resource. This determination is made by comparing a resource address in the request with one or more sanctioned resource addresses used by the particular hosted service. The technology disclosed determines that the webpage is effectuating a phishing attack and blocks transmission of the confidential information to the unsanctioned resource.

20 Claims, 12 Drawing Sheets

Related U.S. Application Data

(60) Provisional application No. 62/966,412, filed on Jan. 27, 2020.

(51) Int. Cl.
*H04L 9/40* (2022.01)
*H04L 67/02* (2022.01)

(58) Field of Classification Search
CPC ..... H04L 69/22; H04L 63/20; H04L 63/1466; H04L 63/1425; H04L 63/1483; H04W 12/12; G04L 67/02; G06F 21/6245; G06F 2221/2119; G06Q 10/107
See application file for complete search history.

(56) References Cited

U.S. PATENT DOCUMENTS

| | | | |
|---|---|---|---|
| 6,622,248 | B1 | 9/2003 | Hirai |
| 7,080,408 | B1 | 7/2006 | Pak et al. |
| 7,298,864 | B2 | 11/2007 | Jones |
| 7,376,719 | B1 | 5/2008 | Shafer et al. |
| 7,735,116 | B1 | 6/2010 | Gauvin |
| 7,966,654 | B2 | 6/2011 | Crawford |
| 8,000,329 | B2 | 8/2011 | Fendick et al. |
| 8,296,178 | B2 | 10/2012 | Hudis et al. |
| 8,793,151 | B2 | 7/2014 | DelZoppo et al. |
| 8,839,417 | B1 | 9/2014 | Jordan |
| 9,197,601 | B2 | 11/2015 | Pasdar |
| 9,225,734 | B1 | 12/2015 | Hastings |
| 9,231,968 | B2 | 1/2016 | Fang et al. |
| 9,280,678 | B2 | 3/2016 | Redberg |
| 9,811,662 | B2 | 11/2017 | Sharpe et al. |
| 10,084,825 | B1 | 9/2018 | Xu |
| 10,237,282 | B2 | 3/2019 | Nelson et al. |
| 10,334,442 | B2 | 6/2019 | Vaughn et al. |
| 10,382,468 | B2 | 8/2019 | Dods |
| 10,484,334 | B1 | 11/2019 | Lee et al. |
| 10,726,424 | B1 * | 7/2020 | Yee ......................... H04L 67/02 |
| 10,728,239 | B2 * | 7/2020 | Maylor ................. H04L 51/046 |
| 10,826,941 | B2 | 11/2020 | Jain et al. |
| 11,032,301 | B2 | 6/2021 | Mandrychenko et al. |
| 11,036,856 | B2 | 6/2021 | Graun et al. |
| 11,281,775 | B2 | 3/2022 | Burdett et al. |
| 2002/0099666 | A1 | 7/2002 | Dryer et al. |
| 2003/0055994 | A1 | 3/2003 | Herrmann et al. |
| 2003/0063321 | A1 | 4/2003 | Inoue et al. |
| 2003/0172292 | A1 | 9/2003 | Judge |
| 2003/0204632 | A1 | 10/2003 | Willebeek-LeMair et al. |
| 2004/0015719 | A1 | 1/2004 | Lee et al. |
| 2005/0010593 | A1 | 1/2005 | Fellenstein et al. |
| 2005/0271246 | A1 | 12/2005 | Sharma et al. |
| 2006/0156401 | A1 | 7/2006 | Newstadt et al. |
| 2007/0204018 | A1 | 8/2007 | Chandra et al. |
| 2007/0237147 | A1 | 10/2007 | Quinn et al. |
| 2008/0069480 | A1 | 3/2008 | Aarabi et al. |
| 2008/0134332 | A1 | 6/2008 | Keohane et al. |
| 2009/0144818 | A1 | 6/2009 | Kumar et al. |
| 2009/0249470 | A1 | 10/2009 | Litvin et al. |
| 2009/0300351 | A1 | 12/2009 | Lei et al. |
| 2010/0017436 | A1 | 1/2010 | Wolge |
| 2011/0119481 | A1 | 5/2011 | Auradkar et al. |
| 2011/0145594 | A1 | 6/2011 | Jho et al. |
| 2012/0278896 | A1 | 11/2012 | Fang et al. |
| 2013/0159694 | A1 | 6/2013 | Chiueh et al. |
| 2013/0298190 | A1 | 11/2013 | Sikka et al. |
| 2013/0347085 | A1 | 12/2013 | Hawthorn et al. |
| 2014/0013112 | A1 | 1/2014 | Cidon et al. |
| 2014/0068030 | A1 | 3/2014 | Chambers et al. |
| 2014/0068705 | A1 | 3/2014 | Chambers et al. |
| 2014/0259093 | A1 | 9/2014 | Narayanaswamy et al. |
| 2014/0282843 | A1 | 9/2014 | Buruganahalli et al. |
| 2014/0359282 | A1 | 12/2014 | Shikfa et al. |
| 2014/0366079 | A1 | 12/2014 | Pasdar |
| 2015/0100357 | A1 | 4/2015 | Seese et al. |
| 2016/0323318 | A1 | 11/2016 | Terrill et al. |
| 2016/0350145 | A1 | 12/2016 | Botzer et al. |
| 2017/0064005 | A1 | 3/2017 | Lee |
| 2017/0093917 | A1 | 3/2017 | Chandra et al. |
| 2017/0250951 | A1 | 8/2017 | Wang et al. |
| 2019/0327268 | A1 * | 10/2019 | Goutal .................. H04L 63/101 |
| 2020/0050686 | A1 | 2/2020 | Kamalapuram et al. |
| 2020/0311265 | A1 * | 10/2020 | Jones .................... G06F 18/217 |
| 2021/0099485 | A1 * | 4/2021 | Lancioni ................. H04L 67/02 |
| 2021/0144174 | A1 * | 5/2021 | N ........................ H04L 63/1483 |

OTHER PUBLICATIONS

Huckaby, Jeff "Ending Clear Text Protocols," Rackaid.com, Dec. 9, 2008, 3 pgs.
Newton, Harry "fabric," Newton's Telecom Dictionary, 30th Updated, Expanded, Anniversary Edition, 2016, 3 pgs.
Fortinet, "Fortinet Security Fabric Earns 100% Detection Scores Across Several Attack Vectors in NSS Labs' Latest Breach Detection Group Test [press release]", Aug. 2, 2016, 4 pgs, available at https://www.fortinet.com/de/corporate/about-us/newsroom/press-releases/2016/security-fabric-earns-100-percent-breach-detection-scores-nss-labs.
Fortinet, "Fortinet Security Fabric Named 2016 CRN Network Security Product of the Year [press release]", Dec. 5, 2016, 4 pgs, available at https://www.fortinet.com/corporate/about-us/newsroom/press-releases/2016/fortinet-security-fabric-named-2016-crn-network-security-product.
Mccullagh, Declan, "How safe is instant messaging? A security and privacy survey," CNET, Jun. 9, 2008, 14 pgs.
Beck et al., "IBM and Cisco: Together for a World Class Data Center," IBM Redbooks, Jul. 2013, 654 pgs.
Martin, Victoria "Installing internal FortiGates and enabling a security fabric," The Fortinet Cookbook, Jun. 8, 2016, 11 pgs, archived Aug. 28, 2016 at https://web.archive.org/web/20160828235831/http://cookbook.fortinet.com/installing-isfw-fortigate-enabling-csf-54/.
Zetter, Kim, "Revealed: The Internet's Biggest Security Hole," Wired, Aug. 26, 2008, 13 pgs.
Adya et al., "Farsite: Federated, available, and reliable storage for an incompletely trusted environment," SIGOPS Oper. Syst. Rev. 36, SI, Dec. 2002, pp. 1-14.
Agrawal et al., "Order preserving encryption for numeric data," In Proceedings of the 2004 ACM SIGMOD international conference on Management of data, Jun. 2004, pp. 563-574.
Balakrishnan et al., "A layered naming architecture for the Internet," ACM SIGCOMM Computer Communication Review, 34(4), 2004, pp. 343-352.
Downing et al., Naming Dictionary of Computer and Internet Terms, (11th Ed.) Barron's, 2013, 6 pgs.
Downing et al., Dictionary of Computer and Internet Terms, (10th Ed.) Barron's, 2009, 4 pgs.
Zoho Mail, "Email Protocols: What they are & their different types," 2006, 7 pgs. available at https://www.zoho.com/mail/glossary/email-protocols.html#:~:text=mode of communication.-, What are the different email protocols%3F,and also has defined functions.
NIIT, Special Edition Using Storage Area Networks, Que, 2002, 6 pgs.
Chapple, Mike, "Firewall redundancy: Deployment scenarios and benefits," TechTarget, 2005, 5 pgs. available at https://www.techtarget.com/searchsecurity/tip/Firewall-redundancy-Deployment-scenarios-and-benefits?Offer=abt_pubpro_AI-Insider.
Fortinet, FortiGate—3600 User Manual (vol. 1, Version 2.50 MR2) Sep. 5, 2003, 329 pgs.
Fortinet, FortiGate SOHO and SMB Configuration Example, (Version 3.0 MR5), Aug. 24, 2007, 54 pgs.
Fortinet, FortiSandbox—Administration Guide, (Version 2.3.2), Nov. 9, 2016, 191 pgs.
Fortinet, FortiSandbox Administration Guide, (Version 4.2.4) Jun. 12, 2023, 245 pgs. available at https://fortinetweb.s3.amazonaws.com/docs.fortinet.com/v2/attachments/fba32b46-b7c0-11ed-8e6d-fa163e15d75b/FortiSandbox-4.2.4-Administration_Guide.pdf.

(56) References Cited

OTHER PUBLICATIONS

Fortinet,FortiOS—Administration Guide, (Versions 6.4.0), Jun. 3, 2021, 1638 pgs.

Heady et al., "The Architecture of a Network Level Intrusion Detection System," University of New Mexico, Aug. 15, 1990, 21 pgs.

Kephart et al., "Fighting Computer Viruses," Scientific American (vol. 277, No. 5) Nov. 1997, pp. 88-93.

Wang, L., Chapter 5: Cooperative Security in D2D Communications, "Physical Layer Security in Wireless Cooperative Networks," 41 pgs. first online on Sep. 1, 2017 at https://link.springer.com/chapter/10.1007/978-3-319-61863-0_5.

Lee et al., "A Data Mining Framework for Building Intrusion Detection Models," Columbia University, n.d. 13 pgs.

Merriam-Webster Dictionary, 2004, 5 pgs.

Microsoft Computer Dictionary, (5th Ed.), Microsoft Press, 2002, 8 pgs.

Microsoft Computer Dictionary, (4th Ed.), Microsoft Press, 1999, 5 pgs.

Mika et al., "Metadata Statistics for a Large Web Corpus," LDOW2012, Apr. 16, 2012, 6 pgs.

Oxford Dictionary of Computing (6th Ed.), 2008, 5 pgs.

Paxson, Vern, "Bro: a System for Detecting Network Intruders in Real-Time," Proceedings of the 7th USENIX Security Symposium, Jan. 1998, 22 pgs.

Fortinet Inc., U.S. Appl. No. 62/503,252, "Building a Cooperative Security Fabric of Hierarchically Interconnected Network Security Devices." n.d., 87 pgs.

Song et al., "Practical techniques for searches on encrypted data," In Proceeding 2000 IEEE symposium on security and privacy. S&P 2000, May 2000, pp. 44-55.

Dean, Tamara, Guide to Telecommunications Technology, Course Technology, 2003, 5 pgs.

U.S. Appl. No. 60/520,577, "Device, System, and Method for Defending a Computer Network," filed Nov. 17, 2003, 21 pgs.

U.S. Appl. No. 60/552,457, "Fortinet Security Update Technology," filed Mar. 2004, 6 pgs.

Tittel, Ed, Unified Threat Management For Dummies, John Wiley & Sons, Inc., 2012, 76 pgs.

Fortinet, FortiOS Handbook: UTM Guide (Version 2), Oct. 15, 2010, 188 pgs.

Full Definition of Security, Wayback Machine Archive of Merriam-Webster on Nov. 17, 2016, 1 pg.

Definition of Cooperative, Wayback Machine Archive of Merriam-Webster on Nov. 26, 2016, 1 pg.

Pfaffenberger, Bryan, Webster's New World Computer Dictionary, (10th Ed.), 2003, 5 pgs.

JP Application No. 2022-545156 Notice of Reasons for Refusal mailed Aug. 27, 2024.

JP Application No. 2022-545156 Decision to Grant a Patent mailed Dec. 3, 2024.

* cited by examiner

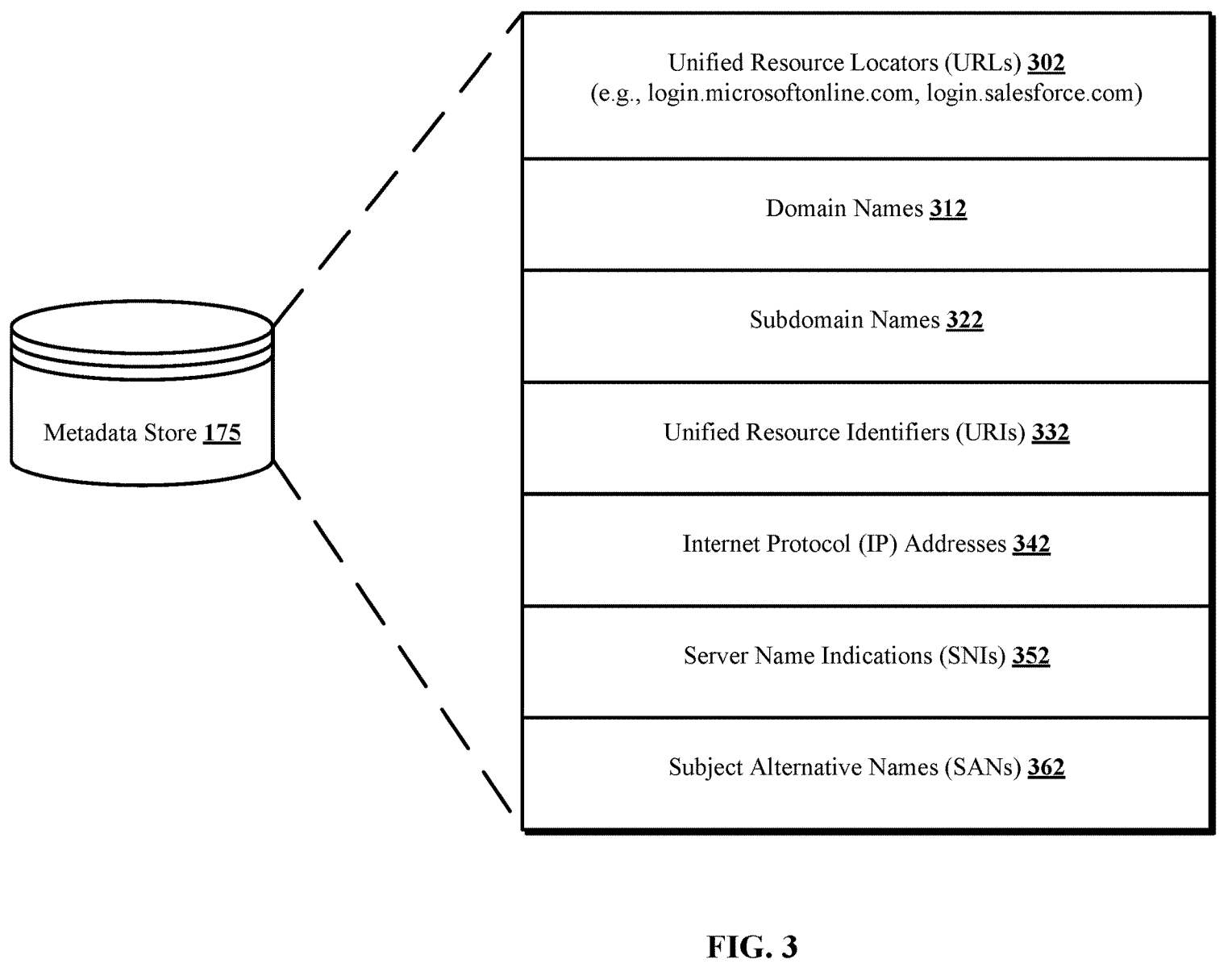

Unified Resource Locators (URLs) 302
(e.g., login.microsoftonline.com, login.salesforce.com)

Domain Names 312

Subdomain Names 322

Unified Resource Identifiers (URIs) 332

Internet Protocol (IP) Addresses 342

Server Name Indications (SNIs) 352

Subject Alternative Names (SANs) 362

Metadata Store 175

FIG. 3

METADATA-BASED DETECTION AND PREVENTION OF PHISHING ATTACKS

PRIORITY DATA

This application is a continuation of and claims the benefit of and priority to U.S. patent application Ser. No. 17/157,947, filed Jan. 25, 2021, titled "METADATA-BASED DETECTION AND PREVENTION OF PHISHING ATTACKS," which claims the benefit of and priority to U.S. Provisional Patent Application No. 62/966,412, filed Jan. 27, 2020, titled "METADATA-BASED DETECTION AND PREVENTION OF PHISHING ATTACKS," the contents of each are incorporated herein by reference in their entireties for all purposes.

INCORPORATIONS

The following materials are incorporated by reference as if fully set forth herein:

U.S. Provisional Patent Application No. 62/307,305, titled "Systems And Methods Of Enforcing Multi-Part Policies On Data-Deficient Transactions Of Cloud Computing Services," filed on Mar. 11, 2016;

U.S. Nonprovisional patent application Ser. No. 16/000,132, titled "Metadata-Based Data Loss Prevention (DLP) For Cloud Storage," filed on Jun. 5, 2018, issued as U.S. Pat. No. 10,291,657 on May 14, 2019;

U.S. Nonprovisional patent application Ser. No. 15/368,240, titled "Systems And Methods Of Enforcing Multi-Part Policies On Data-Deficient Transactions Of Cloud Computing Services," filed on Dec. 2, 2016, issued as U.S. Pat. No. 10,826,940 on Nov. 3, 2020;

U.S. Nonprovisional patent application Ser. No. 15/368,246, titled "Middle Ware Security Layer For Cloud Computing Services," filed on Dec. 2, 2016, issued as U.S. Pat. No. 11,019,101 on May 25, 2021;

Cheng, Ithal, Narayanaswamy, and Malmskog. *Cloud Security For Dummies, Netskope Special Edition*. John Wiley & Sons, Inc. 2015;

U.S. Nonprovisional patent application Ser. No. 14/198,499, titled "Security For Network Delivered Services," filed on Mar. 5, 2014, issued as U.S. Pat. No. 9,398,102 on Jul. 19, 2016;

U.S. Nonprovisional patent application Ser. No. 14/835,640, titled "Systems And Methods Of Monitoring And Controlling Enterprise Information Stored On A Cloud Computing Service (CCS)," filed on Aug. 25, 2015, issued as U.S. Pat. No. 9,928,377 on Mar. 27, 2018;

U.S. Nonprovisional patent application Ser. No. 15/911,034, titled "Simulation And Visualization Of Malware Spread In A Cloud-Based Collaboration Environment," filed on Mar. 2, 2018, issued as U.S. Pat. No. 10,862,916 on Dec. 8, 2020;

U.S. Nonprovisional patent application Ser. No. 15/986,732, titled "Data Loss Prevention Using Category-Directed Parsers," filed on May 22, 2018, issued as U.S. Pat. No. 11,064,013 on Jul. 13, 2021;

U.S. Provisional Patent Application No. 62/488,703, titled "Reducing Latency And Error In Security Enforcement By A Network Security System (NSS)," filed on Apr. 21, 2017;

U.S. Nonprovisional patent application Ser. No. 16/118,278, titled "Enriching Document Metadata Using Contextual Information," filed on Aug. 30, 2018, issued as U.S. Pat. No. 11,403,418 on Aug. 2, 2022;

"Data Loss Prevention and Monitoring in the Cloud" by netSkope, Inc.;

"The 5 Steps to Cloud Confidence" by netSkope, Inc.;

"Netskope Active Cloud DLP" by netSkope, Inc.;

"Repave the Cloud-Data Breach Collision Course" by netSkope, Inc.; and

"NETSKOPE CLOUD CONFIDENCE INDEX™" by netSkope, Inc.

FIELD OF THE TECHNOLOGY DISCLOSED

The technology disclosed relates to securing network traffic to and from hosted services and, in particular, relates to using metadata to detect and prevent phishing attacks that attempt to exfiltrate data from the hosted services.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

Phishing is an attempt from phishers to elicit confidential information of users by using fake websites. Phishers want to get access to private account information and passwords. A successful phishing attack can have disastrous consequences for the victims leading to financial losses and data theft. Usually, phishers send fraudulent emails or chat messages with a link and the lure to click on it. There is a multitude of different phishing attacks like spear phishing, where phishers want to increase their success rate by sending e-mails to specific companies with individual matched content. Another type of phishing is called clone phishing, where phishers clone a previously sent message and replace the legitimate content with malicious information like links or formulas.

The ability to access cloud services from anywhere makes the potential for a successful phishing-based compromise easier. 25% of phishing attacks bypass default security measures built into Office 365, a prominent cloud service which is the most-impersonated brand in phishing attacks.

Cloud-based email has rung in a new era of phishing. The connected nature of cloud-based email allows phishers to get access to a bigger bounty from a single successful phishing attack since the credentials give them access to other connected accounts.

Impersonation phishing attacks involve placing a link to a phishing web page that prompts employees to log in; however, the users are actually sacrificing their credentials to phishers instead of logging in. From there, when the unsuspecting victims click on the link and are directed to a false sign-in page, they provide phishers with their usernames and password without knowing they had done anything out of the ordinary.

After stealing the credentials, the phishers typically use them to remotely log into the user's Office 365 account or other email accounts and use this as a launching point for other spear phishing attacks. At this point, it becomes even more difficult to detect phishers at work because they send additional phishing emails to other employees or external partners, trying to entice those recipients to click on a phishing link.

Impersonation phishing attacks are challenging to detect for several reasons. Phishing links are typically zero-day where a unique link is sent to each recipient, and therefore they never appear on any security blacklists. In many cases, the phishing links lead to a legitimate website, where the attacker has maliciously inserted a sign-in page, and the domain and IP reputation are legitimate. Link protection technologies such as safe links do not protect against these phishing links. Since the phishing link just contains a sign-in page and does not download any malicious viruses, the user follows the safe link and still enters the username and password.

Therefore, effective protection against phishing is needed.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings.

FIG. 3 illustrates one implementation of a metadata store and its contents that identify sanctioned resource addresses used by hosted services.

DETAILED DESCRIPTION

The following discussion is presented to enable any person skilled in the art to make and use the technology disclosed, and is provided in the context of a particular application and its requirements. Various modifications to the disclosed implementations will be readily apparent to those skilled in the art, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein.

Figure 1:
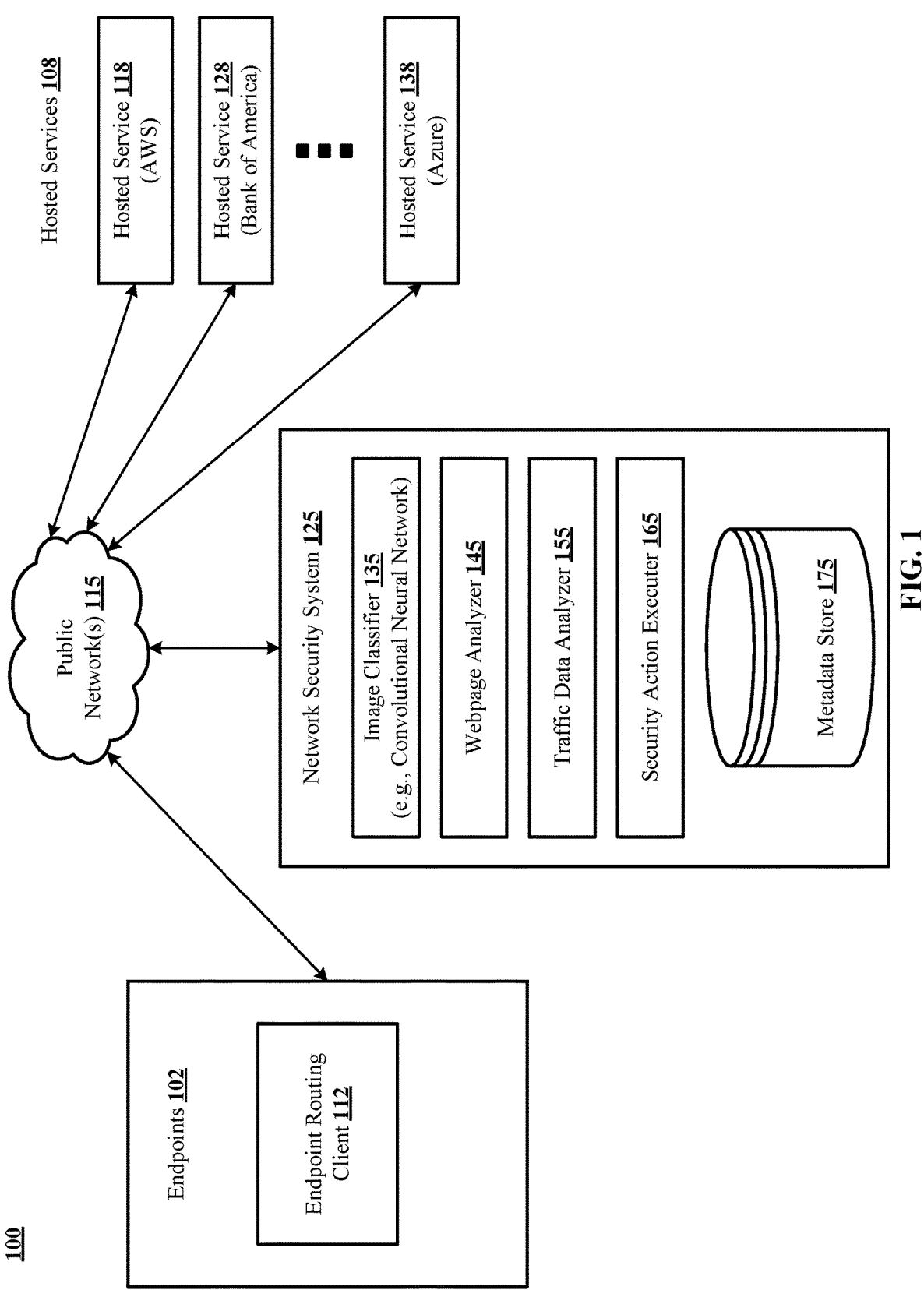
FIG. 1 shows one implementation of detecting and preventing phishing attacks using a network security system.

We describe a system and various implementations for detecting and preventing phishing attacks. The system and processes are described with reference to FIG. 1. Because FIG. 1 is an architectural diagram, certain details are intentionally omitted to improve the clarity of the description. The discussion of FIG. 1 is organized as follows. First, the elements of the figure are described, followed by their interconnections. Then, the use of the elements is described in greater detail.

FIG. 1 illustrates one implementation of the technology disclosed operating in an environment 100. The environment 100 includes endpoints 102, the network security system 125, and hosted services 108. Endpoints 102 access contents (e.g., documents) stored in the hosted services 108 via the network security system 125. Endpoints 102 comprise an endpoint routing client 112.

The network security system 125 includes an image classifier 135 (e.g., convolutional neural network), a webpage analyzer 145, a traffic data analyzer 155, a security action executer 165, and a metadata store 175.

The modules of the endpoints 102 and the network security system 125 can be implemented in hardware or software, and need not be divided up in precisely the same blocks as shown in FIG. 1. Some of the modules can also be implemented on different processors or computers, or spread among a number of different processors or computers. In addition, it will be appreciated that some of the modules can be combined, operated in parallel or in a different sequence than that shown in FIG. 1 without affecting the functions achieved. Also, as used herein, the term "module" can include "sub-modules," which themselves can be considered to constitute modules. The blocks in the endpoints 102 and the network security system 125, designated as modules, can also be thought of as flowchart steps in a method. A module also need not necessarily have all its code disposed contiguously in memory; some parts of the code can be separated from other parts of the code with code from other modules or other functions disposed in between.

The interconnections of the elements of environment 100 are now described. The public network(s) 115 couples the endpoints 102, the network security system 125, and the hosted services 108, all in communication with each other (indicated by solid double-arrowed lines). The actual communication path can be point-to-point over public and/or private networks. Some items, such as the endpoint routing client 112, might be delivered indirectly, e.g., via an application store (not shown). The communications can occur over a variety of networks, e.g., private networks, VPN (Virtual Private Network), MPLS circuit, or Internet, and can use appropriate application programming interfaces (APIs) and data interchange formats, e.g., Representational State Transfer (REST), JavaScript Object Notation (JSON), Extensible Markup Language (XML), Simple Object Access Protocol (SOAP), Java Message Service (JMS), and/or Java Platform Module System. All of the communications can be encrypted. The communication is generally over a network such as the LAN (local area network), WAN (wide area network), telephone network (Public Switched Telephone Network (PSTN), Session Initiation Protocol (SIP), wireless network, point-to-point network, star network, token ring network, hub network, Internet, inclusive of the mobile Internet, via protocols such as EDGE, 3G, 4G LTE, Wi-Fi, and WiMAX. Additionally, a variety of authorization and authentication techniques, such as username/password, Open Authorization (OAuth), Kerberos, SecureID, digital certificates and more, can be used to secure the communications.

Endpoints 102 can be desktop computers, laptops, tablet computers, mobile phones, or any other type of computing devices. The engines or system components of environment 100 such as the network security system 125 are implemented by software running on varying types of computing devices. Example devices are a workstation, a server, a computing cluster, a blade server, and a server farm.

Having introduced the elements of FIG. 1 and their interconnections, elements of the figure are now described in greater detail.

In FIG. 1, three hosted services AMAZON WEB SERVICES (AWS)™ 118, BANK OF AMERICA™ 128, and MICROSOFT AZURE™ 138 are shown, however, it is understood that environment 100 can include any number of hosted services. Hosted services 108 can be cloud computing and storage services, financial services, e-commerce services, or any type of applications, websites, or platforms. Often, hosted services 108 are the most-commonly used cloud applications such as BOX™, DROPBOX™, AMAZON AWS™, GOOGLE DRIVE™ GOOLE CLOUD PLATFORM (GCP)™, MICROSOFT AZURE™, EVERNOTE™, and so on. Hosted services can be referred to as cloud services, cloud applications, cloud storage applications (services), and cloud computing applications (services).

Hosted services 108 provide functionality to users that can be implemented in the cloud and that can be the target of data loss prevention (DLP) policies, e.g., logging in, editing documents, downloading bulk data, reading customer contact information, entering payables, and deleting documents. Hosted services 108 can be a network service or application, or can be web-based (e.g., accessed via a URL) or native, such as sync clients. Examples include software-as-a-service (SaaS) offerings, platform-as-a-service (PaaS) offerings, and infrastructure-as-a-service (IaaS) offerings, as well as internal enterprise applications that are exposed via URLs. Examples of common hosted services today include BOX™, GOOGLE DRIVE™ SALESFORCE.COM™, DROPBOX™, MICROSOFT ONEDRIVE 365™, APPLE ICLOUD DRIVE™, ORACLE ON DEMAND™, SUGARSYNC™, IDRIVE™, and SPIDEROAK ONE™.

Sanctioned hosted services are those hosted services that the company provides for employee use and of which IT is aware. IT usually has full administrative control over these hosted services and maintains them on behalf of the business. Even though IT may manage sanctioned hosted services, the department still may lack specific knowledge about how users are accessing these hosted services and what activities they are performing, including uploading, downloading, sharing, or editing corporate data.

Unsanctioned hosted services are those hosted services that the company does not know about. Very often, if IT does not provide the necessary tools to accomplish a needed business function, employees go outside of IT and procure their own hosted services. Employees can easily find, pay for, download, and administer these hosted services without IT's knowledge or assistance. On the one hand, this is a good thing because it gives employees a way to work efficiently. On the other hand, these unsanctioned hosted services create risk for IT. Keeping hosted services and the data within them secure is challenging when IT does not know about them. IT cannot properly enforce security or compliance in unsanctioned hosted services. Without important security features, such as strong user authentication and audit logging, these hosted services and the data within them are vulnerable to inadvertent or intentional data exposure. Finally, IT has no idea how users are using unsanctioned hosted services.

Hosted services 108 can also be determined/identified/ graded based on NETSKOPE CLOUD CONFIDENCE INDEX™ that assesses a hosted service's enterprise-readiness based on objective criteria and assigns an overall score. In particular, NETSKOPE CLOUD CONFIDENCE INDEX™ measures the enterprise readiness of hosted services by taking into various attributes of the hosted services. The following list of hosted service attribute is exemplary rather than exhaustive and includes: encryption policies, auditability and business continuity, disaster management policies, number of data centers, compliance certifications (e.g. SOC2) of the data centers, identity and access control, file sharing, data classification, audit and alert, data access logs preservation, password policy, forfeiture policies, published data recovery plan, and ability to proxy traffic for inspection and security controls.

In some implementations, NETSKOPE CLOUD CONFIDENCE INDEX™ assigns a score between 0 and 100 to each hosted service that interfaces with an organization's network. Further, based on the assigned score, the hosted services can be categorized into different cloud confidence levels such as excellent, high, medium, low, or poor.

In other implementations, NETSKOPE CLOUD CONFIDENCE INDEX™ groups the hosted services into a plurality of categories, including cloud storage, collaboration, finance and accounting, customer relationship management (CRM), human resources, and software development.

Hosted services 108 publish their application programming interfaces (APIs) to allow a third party to communicate with them and utilize their underlying data. An API refers to a packaged collection of code libraries, routines, protocols methods, and fields that belong to a set of classes, including its interface types. The API defines the way that developers and programmers can use the classes for their own software development, just by importing the relevant classes and writing statements that instantiate the classes and call their methods and fields. An API is a source code-based application intended to be used as an interface by software components to communicate with each other. An API can include applications for routines, data structures, object classes, and variables. Basically, an API provides an interface for developers and programmers to access the underlying data, platform capabilities, and features of hosted services. Implementations of the technology disclosed use different types of APIs, including web service APIs such as HTTP or HTTPs based APIs like SOAP, WSDL, Bulk, XML-RPC and JSON-RPC and REST APIs (e.g., FLICKR™, GOOGLE STATIC MAPS™, GOOGLE GEOLOCATION™), web socket APIs, library-based APIs like JavaScript and TWAIN (e.g., GOOGLE MAPS™ Javascript API, DROPBOX™ JavaScript Data store API, TWILIO™ APIs, Oracle Call Interface (OCI)), class-based APIs like Java API and Android API (e.g., GOOGLE MAPS™ Android API, MSDN Class Library for .NET Framework, TWILIO™ APIs for Java and C#), OS functions and routines like access to file system and access to user interface, object remoting APIs like CORBA and .NET Remoting, and hardware APIs like video acceleration, hard disk drives, and PCI buses. Other examples of APIs used by the technology disclosed include AMAZON EC2 API™, BOX CONTENT API™, BOX EVENTS API™, MICROSOFT GRAPH™, DROP-BOX API™, DROPBOX API v2™, DROPBOX CORE API™, DROPBOX CORE API v2™, FACEBOOK GRAPH API™, FOURSQUARE API™, GEONAMES API™, FORCE.COM API™, FORCE.COM METADATA API™, APEX API™, VISUALFORCE API™, FORCE.COM ENTERPRISE WSDL™, SALESFORCE.COM STREAM-ING API™, SALESFORCE.COM TOOLING API™, GOOGLE DRIVE API™, DRIVE REST API™, ACCUWEATHER API™, and aggregated-single API like CLOUDRAIL™ API Having described the hosted services 108 and their APIs, the discussion now turns to the network security system 125.

The network security system 125 provides a variety of functionalities, including using the image classifier 135 to analyze one or more images of a webpage and determine that a particular hosted service is represented by the images, using the webpage analyzer 145 to analyze one or more fields of the webpage and determine that the fields elicit confidential information, using the traffic data analyzer 155 to analyze a request (e.g., HTTP request) and determine that the confidential information is being exfiltrated to an unsanctioned resource by comparing a resource address in the request with one or more sanctioned resource addresses used by the particular hosted service, using the metadata store 175 to store/list/identify the sanctioned resource addresses, and using the security action executer 165 to block transmission of the confidential information to the unsanctioned resource. These functionalities collectively prevent phishers from maliciously accessing the hosted services 108 via the endpoints 102. More generally, the network security system 125 provides application visibility and control functions as well as security.

The image classifier 135 can implement any image classification algorithm such as convolutional neural networks, state vector machines, random forests, and gradient boosted decision trees. The image classifier 135 can be trained to map webpage images to hosted services 108 using back-propagation-based stochastic gradient update training techniques (e.g., by using the ADAM training algorithm).

The webpage analyzer 145 parses and analyzes an HTML document, a PDF, an image, a JavaScript code, a data storage layer (e.g., localStorage, IndexedDB, WebSQL, FileSystem), or some other type of content (e.g., cascading style sheets (CSS)). In one implementation, the webpage analyzer 145 parses the HTML document and converts elements to DOM nodes in a content tree. In another implementation, it parses and analyzes the already generated content tree. In one implementation, it parses and analyzes style data, both in external CSS files and in style elements. In another implementation, it parses and analyzes a render tree that contains styling information together with visual instructions in the HTML document. In some implementations, the parsing also includes lexical analysis and syntax analysis of the text and fields (key-value pairs) of the HTML document.

The traffic data analyzer 155 parses and analyzes Hypertext Transfer Protocol (HTTP) requests such as GET requests, POST requests, and HEAD requests. The HTTP requests include general headers (connection, date), request/response headers, and entity headers (content-length, content-type, last-modified). In one implementation, the traffic data analyzer 155 parses and analyzes the HTTP headers in the POST requests. In one implementation, the traffic data analyzer 155 uses connectors or standardized integrations to interpret the HTTP transactions using deep API inspection (DAPII).

The security action executer 165 executes security actions, including block, alert, bypass, quarantine, coach, initiate a workflow to remediate, record, seek justification, report on the out-of-compliance event or activity, or content encryption. The type of the security action can be based on at least one of the type of the content policies, the content-level activity being performed, and the content-type. In other implementations, certain off-line inspections can be triggered as security actions, such as changing the ownership of sensitive data.

For further information regarding the functionalities of the network security system 125, reference can be made to, for example, commonly owned U.S. patent application Ser. Nos. 14/198,499; 14/198,508; 14/835,640; 14/835,632; and 62/307,305; Cheng, Ithal, Narayanaswamy, and Malmskog. Cloud Security For Dummies, Netskope Special Edition. John Wiley & Sons, Inc. 2015; "Netskope Introspection" by Netskope, Inc.; "Data Loss Prevention and Monitoring in the Cloud" by Netskope, Inc.; "Cloud Data Loss Prevention Reference Architecture" by Netskope, Inc.; "The 5 Steps to Cloud Confidence" by Netskope, Inc.; "The Netskope Reactive Platform" by Netskope, Inc.; "The Netskope Advantage: Three "Must-Have" Requirements for Cloud Access Security Brokers" by Netskope, Inc.; "The 15 Critical NSS Use Cases" by Netskope, Inc.; "Netskope Reactive Cloud DLP" by Netskope, Inc.; "Repave the Cloud-Data Breach Collision Course" by Netskope, Inc.; and "Netskope Cloud Confidence Index™" by Netskope, Inc., which are incorporated by reference for all purposes as if fully set forth herein.

Regarding the endpoint routing client 112, it routes network traffic emanating from the endpoints 102 to the network security system 125. Depending on the type of device, it can be a virtual private network (VPN) such as VPN on demand or per-app-VPN that use certificate-based authentication. For example, for iOS™ devices, it can be a per-app-VPN or can be a set of domain-based VPN profiles. For Android™ devices, it can be a cloud director mobile app. For Windows™ devices, it can be a per-app-VPN or can be a set of domain-based VPN profiles. Endpoint routing client 112 can also be an agent that is downloaded using e-mail or silently installed using mass deployment tools like ConfigMgr™, Altris™, and Jamfr™.

Figure 2:
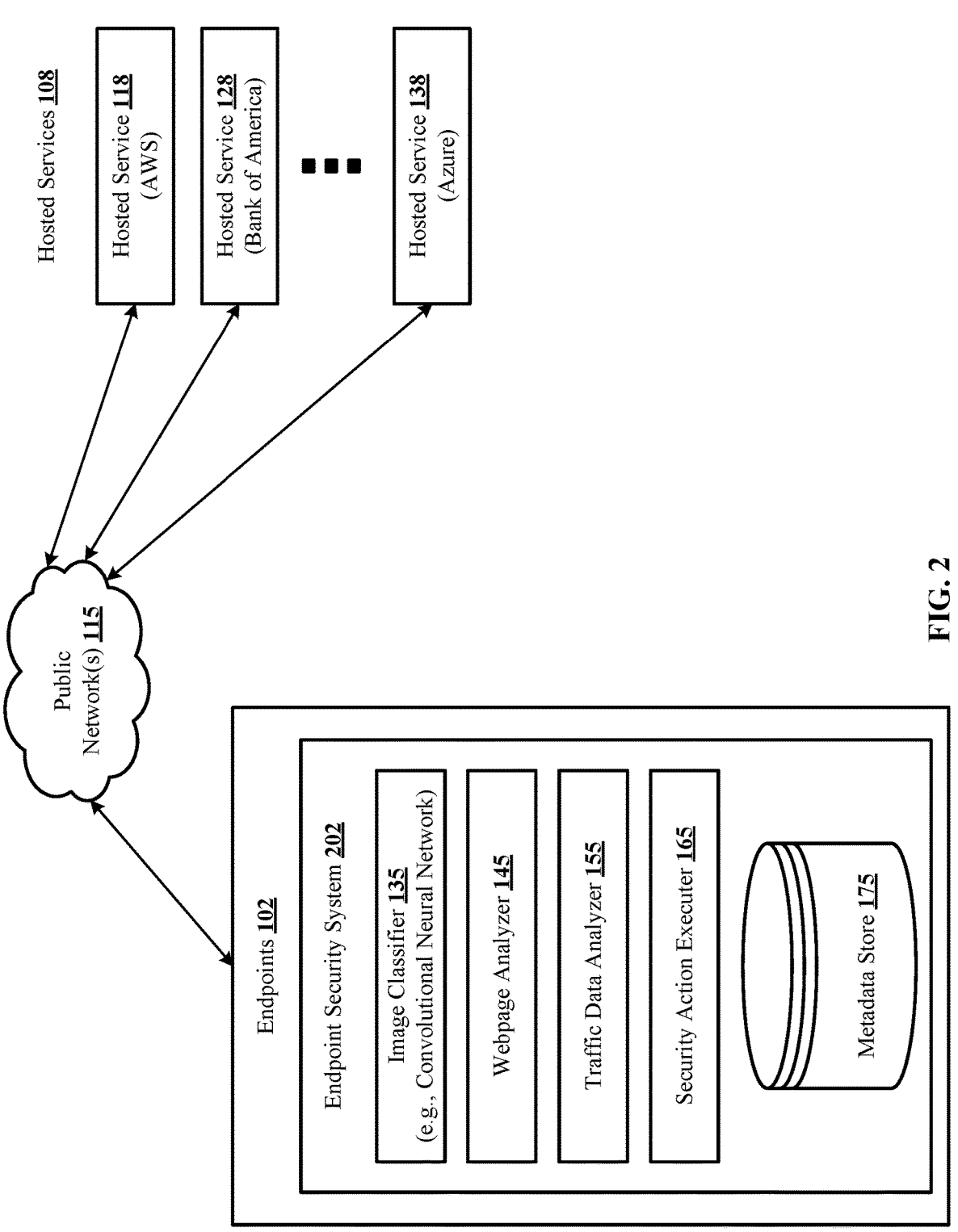
FIG. 2 shows one implementation of detecting and preventing the phishing attacks using an endpoint security system.

FIG. 2 shows one implementation of detecting and preventing the phishing attacks using an endpoint security system 202. In environment 200, the endpoints 102 are configured with the endpoint security system 202. The endpoint security system 202 comprises the image classifier 135, the webpage analyzer 145, the traffic data analyzer 155, the security action executer 165, and the metadata store 175.

The endpoint security system 202 provides a variety of functionalities, including using the image classifier 135 to analyze one or more images of a webpage and determine that a particular hosted service is represented by the images, using the webpage analyzer 145 to analyze one or more fields of the webpage and determine that the fields elicit confidential information, using the traffic data analyzer 155 to analyze a request (e.g., HTTP request) and determine that the confidential information is being exfiltrated to an unsanctioned resource by comparing a resource address in the request with one or more sanctioned resource addresses used by the particular hosted service, using the metadata store 175 to store/list/identify the sanctioned resource addresses, and using the security action executer 165 to block transmission of the confidential information to the unsanctioned resource. These functionalities collectively prevent phishers from maliciously accessing the hosted services 108 via the endpoints 102. More generally, the endpoint security system 202 provides application visibility and control functions as well as security.

FIG. 3 illustrates one implementation of the metadata store 175 and its contents that identify sanctioned resource addresses used by hosted services. In one implementation, the metadata store 175 identifies/lists resource addresses of sanctioned hosted services. Examples of resource addresses include uniform resource locators (URLs) such as login.microsoftonline.com and login.salesforce.com, domain names, subdomain names, uniform resource identifiers (URIs), internet protocol (IP) addresses, server name indications (SNIs), and subject alternative names (SANs). These contents of the metadata store 175 can be referred to as "metadata."

Figure 4:
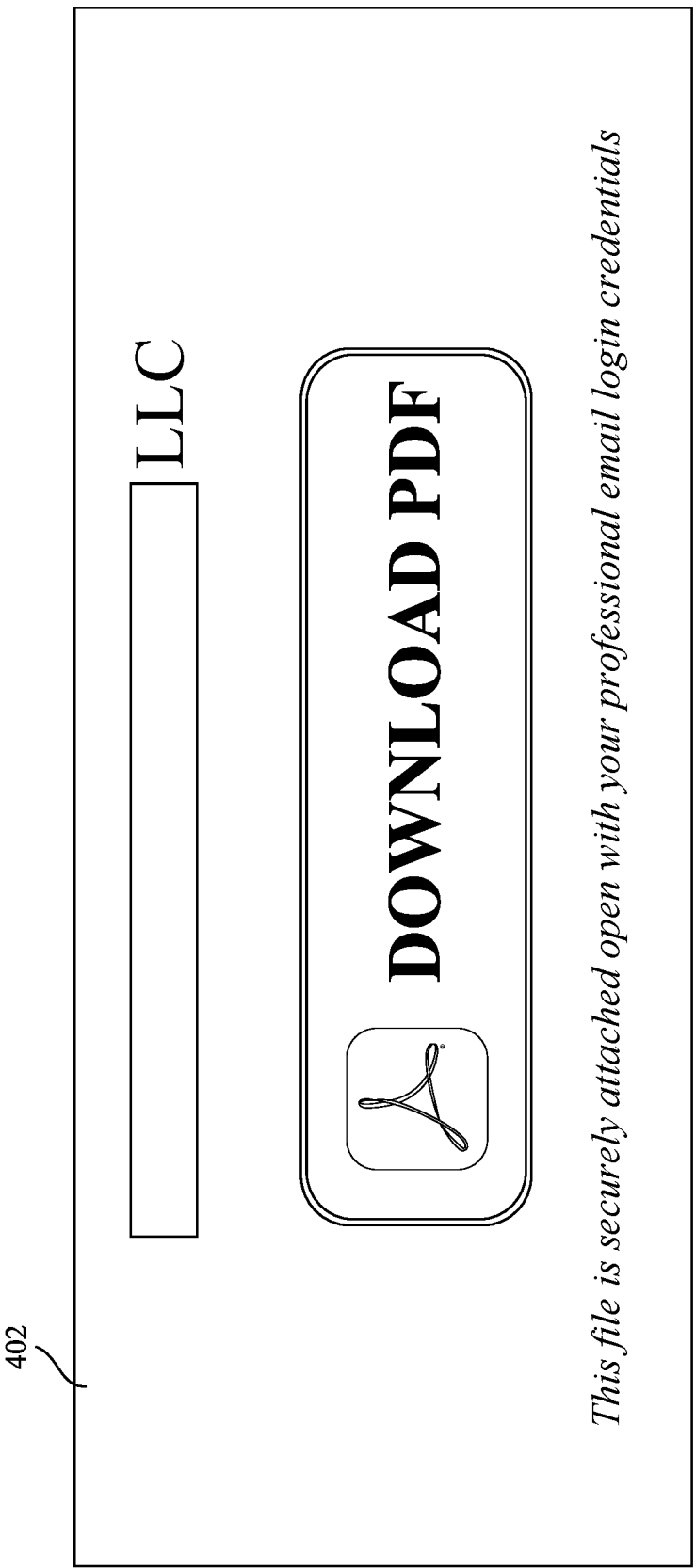
FIG. 4 depicts one example of a phishing decoy sent to a phishing victim.

FIG. 4 depicts one example of a phishing decoy 402 sent to a phishing victim. The phishing decoy 402 is a PDF hosted in the hosted service GOOGLE DRIVE™ and impersonates a law firm in Denver, Colorado (CO). The phishing decoy 402 is linked to a MICROSOFT OFFICE 365™ phishing webpage hosted in AZURE™ blob storage. Since the phishing decoy 402 is hosted in MICROSOFT AZURE™ blob storage, it has a Microsoft-issued domain and a secure sockets layer (SSL) certificate. The combination of the Microsoft-issued domain and certificate, along with the Microsoft content (webpage) make this bait particularly convincing and difficult to recognize as phishing.

The phishing decoy 402 traditionally arrives as an email attachment to phishing victims. It is crafted to contain legitimate content and comes from legitimate sources. Often, attachments are saved to cloud storage services like GOOGLE DRIVE™. Sharing these documents with other users can cause secondary propagation vector like the cloud fishing fan-out effect described in U.S. Nonprovisional patent application Ser. No. 15/911,034, which is incorporated herein.

Figure 5:
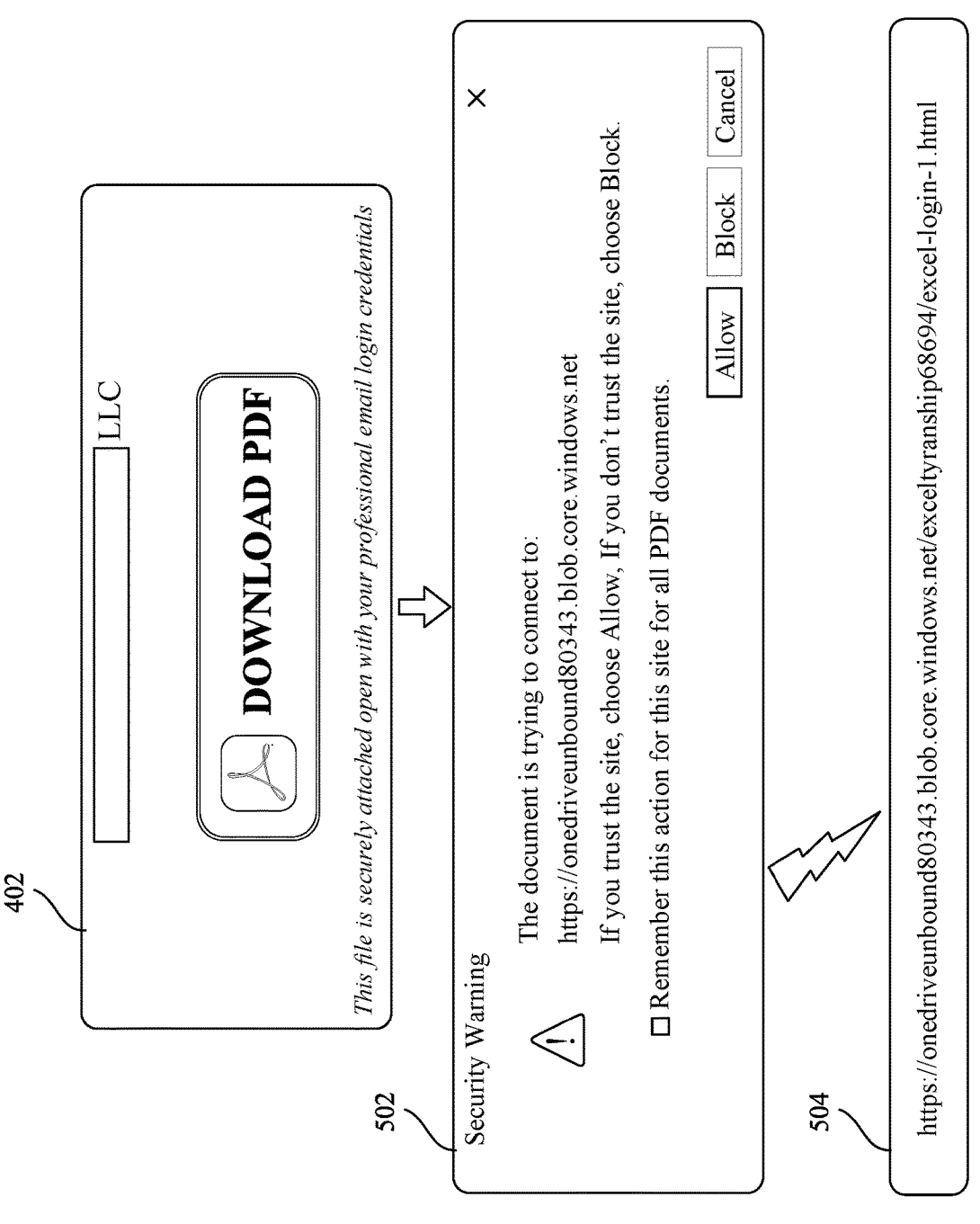
FIG. 5 shows the phishing decoy of FIG. 4 connecting to a uniform resource locator (URL) of a sanctioned cloud computing and storage service when the phishing victim clicks on the phishing decoy.

FIG. 5 shows the phishing decoy 402 of FIG. 4 connecting to a uniform resource locator (URL) 504 of a sanctioned cloud computing and storage service Azure blob storage when the phishing victim clicks on the phishing decoy 402.

The phishing decoy 402 contains a hyperlink to download the actual PDF, as shown in FIG. 4. Upon clicking the "Download PDF" hyperlink, the victim is presented with a message 502 that the document is trying to connect to the Azure blob storage URL 504.

Figure 6:
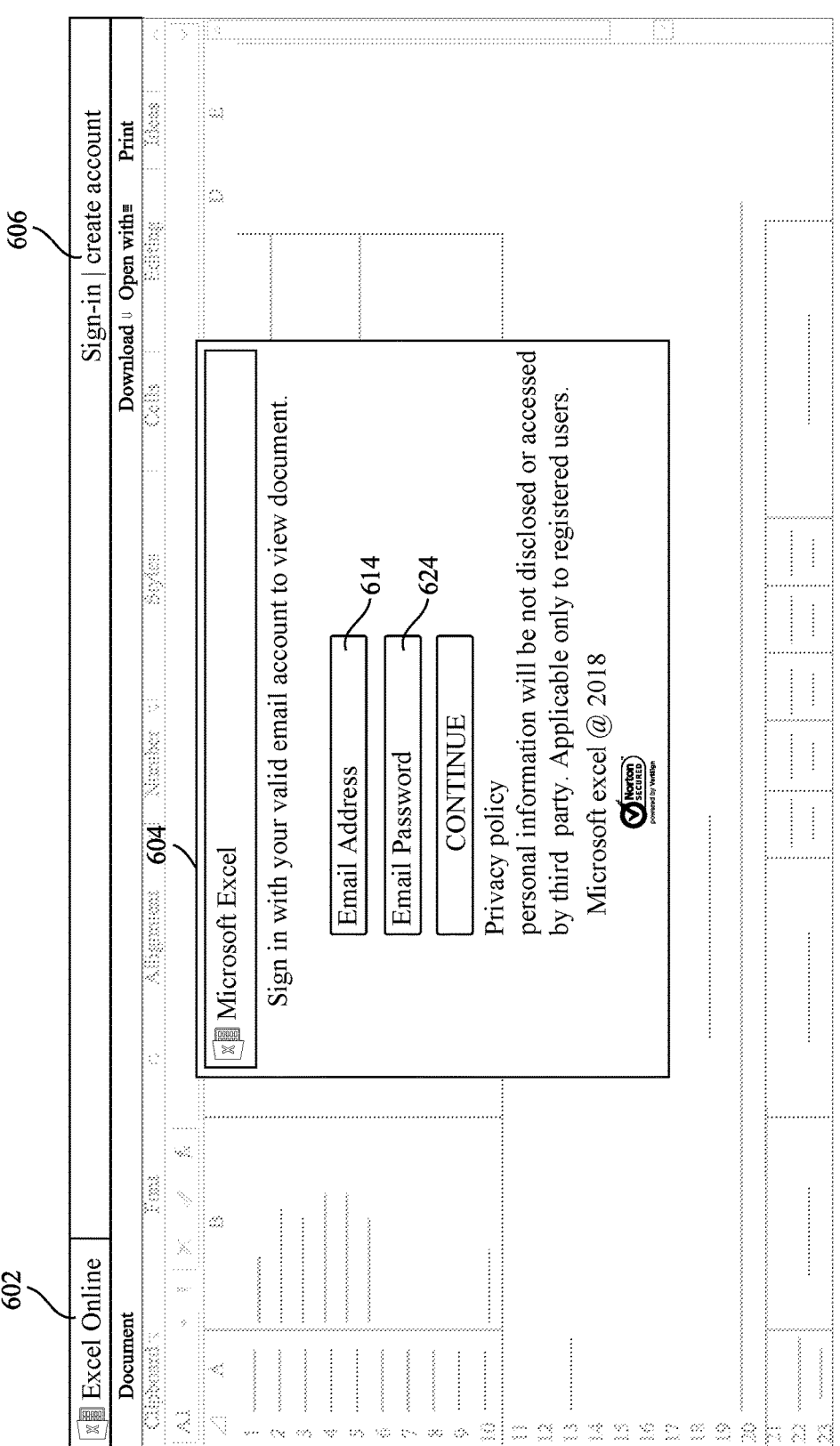
FIG. 6 illustrates a phishing webpage presented to the phishing victim in response to the phishing victim clicking the URL of the sanctioned cloud computing and storage service.

FIG. 6 shows the phishing webpage 602 that is presented to the victim after clicking the hyperlink. The phishing webpage 602 contains one or more images with image features 604 and 606 and fields 614 and 624.

Figure 7:
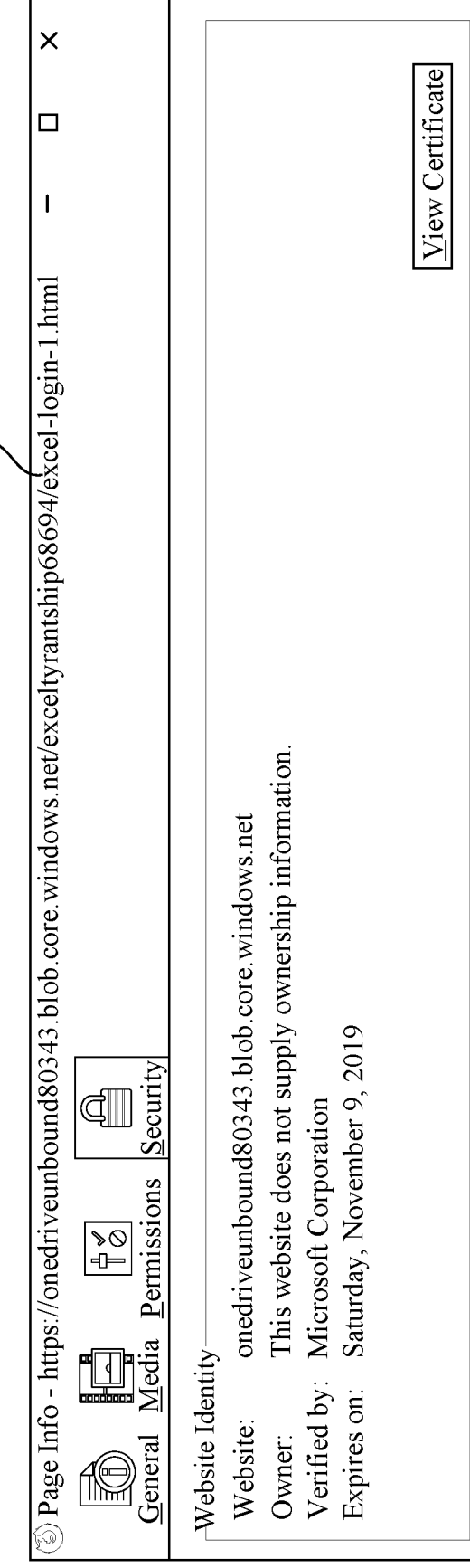
FIG. 7 shows that the phishing webpage of FIG. 6 has a valid domain and certificate.
Figure 8:
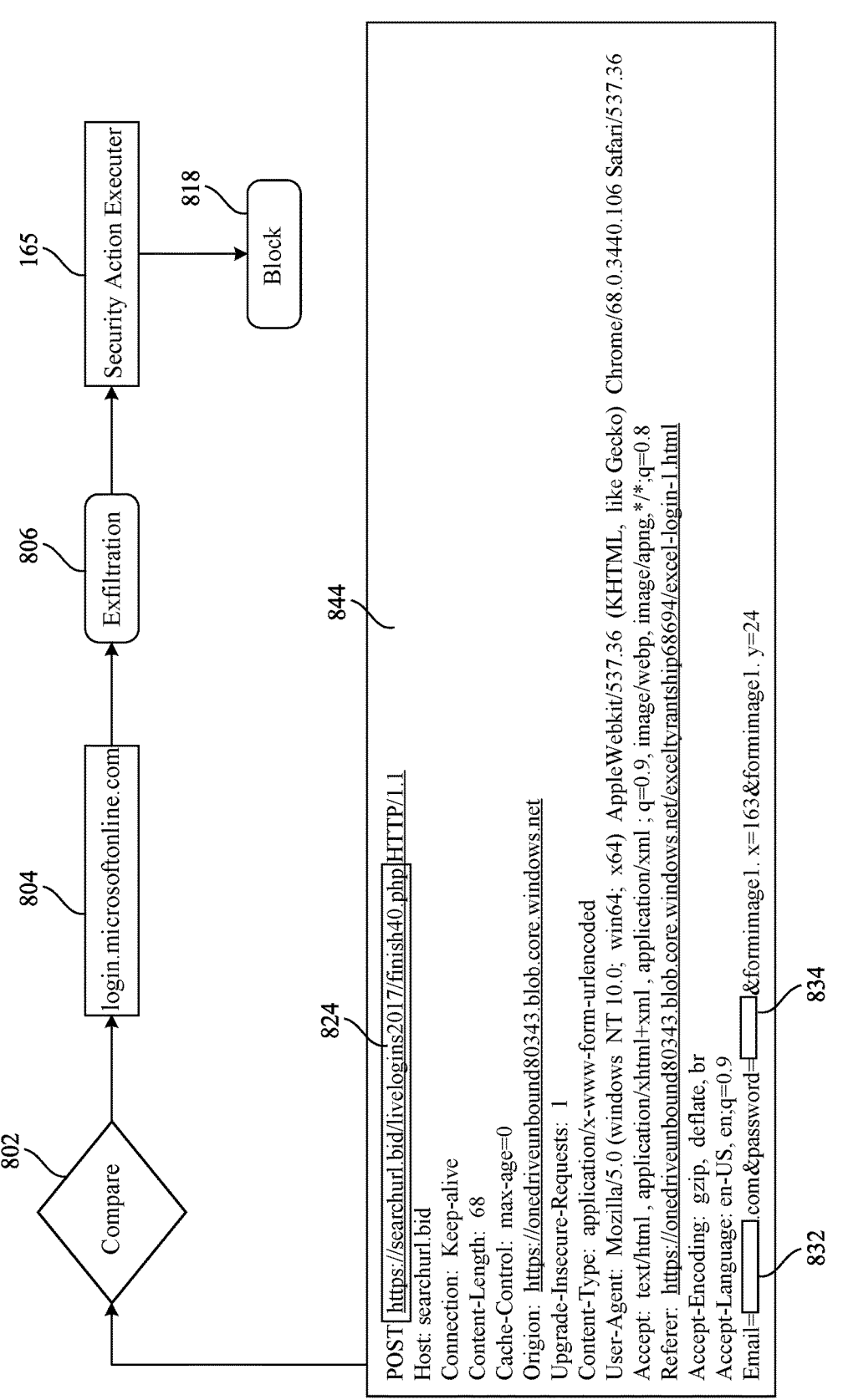
FIG. 8 depicts one implementation of preventing exfiltration of confidential information to an unsanctioned resource by comparing a resource address in a request with sanctioned resource addresses used by the hosted services and identified in the metadata store.

The phishing webpage 602 is hosted in Azure blob storage. As a result, it has a valid Microsoft-issued SSL certificate 702 and is hosted on a Microsoft-owned domain, as shown in FIG. 7. At face value, seeing a Microsoft domain and a Microsoft-issued SSL certificate 702, on a site asking for MICROSOFT OFFICE 365™ credentials is pretty strong evidence that the site is legitimate and are likely enough to convince a user to enter their credentials. Upon clicking continue, the victim's credentials are uploaded to https://searchurl.bid/livelogins2017/finish40.php 824, as shown in FIG. 8.

First, the image classifier 135 accesses the images of the phishing webpage 602 and, based on processing the image features 604 and 606, determines that the images are used by the MICROSOFT EXCEL™ application of the hosted service MICROSOFT OFFICE 365™. Therefore, the image classifier 135 predicts that the images of the phishing webpage 602 represent the hosted service MICROSOFT OFFICE 365™.

Then, the webpage analyzer 145 parses the phishing webpage 602 and analyzes the fields 614 and 624. Based on the analysis of the fields 614 and 624, the webpage analyzer 145 infers that the fields 614 and 624 are eliciting confidential information, i.e., email addresses and email password. In other implementations, different type of confidential information may be elicited and thereby detected. Some examples include controlled unclassified information (CUI), personally identifiable information (PII), protected health information (PHI), payment card industry (PCI) information, social security numbers, driver's license information, and biometric records.

The traffic data analyzer 155 then parses the HTTP header 844 and determines that the confidential information 832 and 834 is being uploaded to the URL 824 in the POST field. Then, the traffic data analyzer 155 accesses the metadata store 175 to determine which sanctioned resource addresses 804 (URLs, domain names, subdomain names, URIs, IP addresses, SNIs, SANs) are associated with the hosted service MICROSOFT OFFICE 365™ The traffic data analyzer 155 then compares 802 substrings of the URL 824 with substrings of the sanctioned resource addresses 804. If, based on the comparison 802, the traffic data analyzer 155 determines that the URL 824 is not a sanctioned resource address of the hosted service MICROSOFT OFFICE 365™. Therefore, the traffic data analyzer 155 determines that the confidential information 832 and 834 is being exfiltrated 806 to an unsanctioned resource or location.

The security action executer 165 stops the exfiltration 806 by blocking 818 the posting of the confidential information 832 and 834 to the unsanctioned URL 824.

Figure 9:
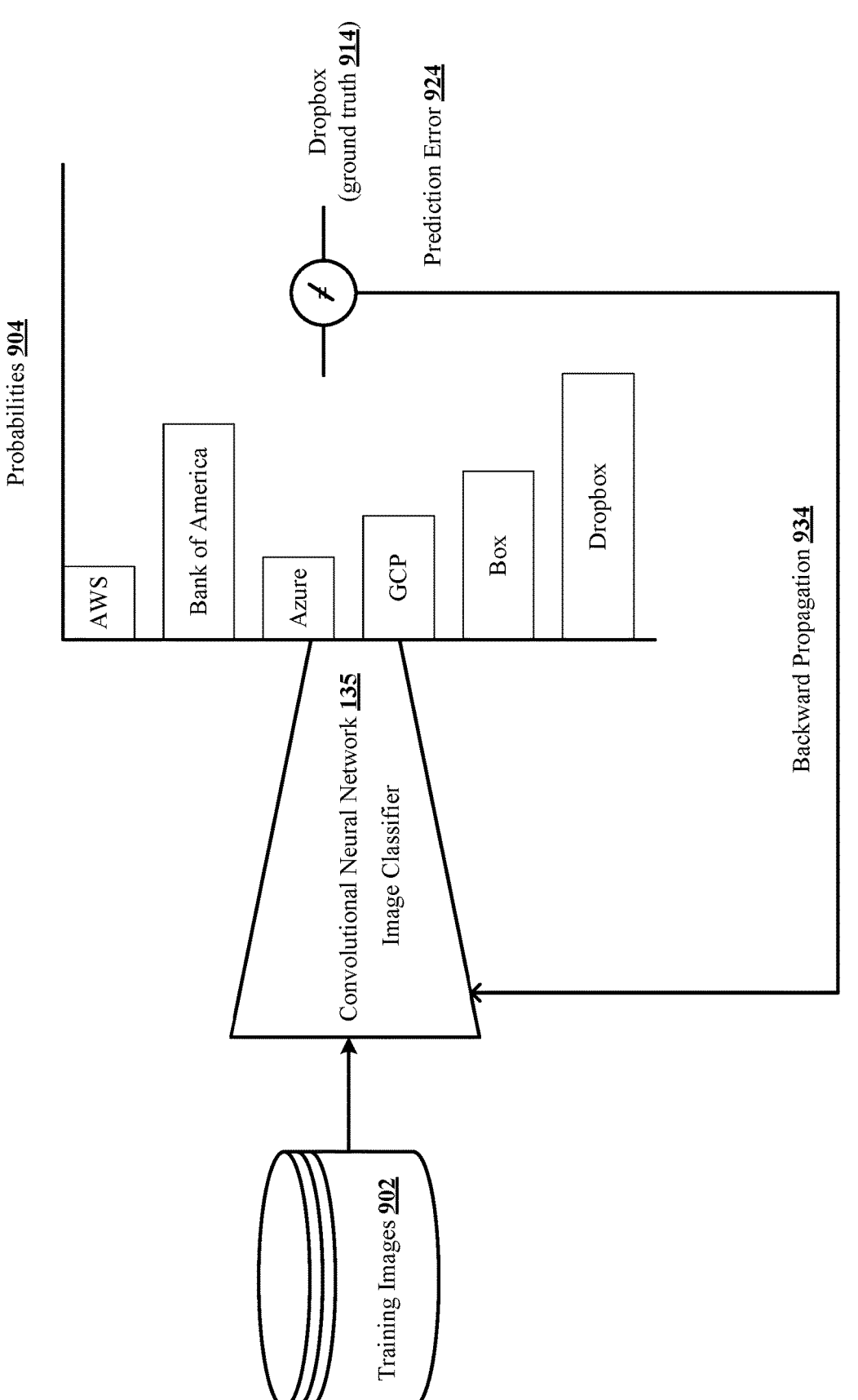
FIG. 9 shows one implementation of training an image classifier to map webpage images to hosted services.

FIG. 9 shows one implementation of training the image classifier 135 to map webpage images to hosted services. Training images 902 are used as training data for training the image classifier 135 and contain images crawled and extracted from webpages and websites of the most-commonly used sanctioned hosted services. Each image is labelled with ground truth 914 that identifies the corresponding hosted service. In one implementation, the image classifier 135 is a convolutional neural network (CNN) with a softmax classification layer that produces confidence score probabilities 904 for a plurality of hosted services (e.g., AWS, BoA, Azure, GCP, Box, Dropbox). The training uses backward propagation 934 to apply gradients calculated from the predicted error 924 to parameters and weights of the convolutional neural network.

In other implementations of the technology disclosed, in addition to or instead of the machine learning-based classification approaches, the technology disclosed can use image fingerprinting algorithms like perceptual hashing for image disambiguation and classification. Additional details about perceptual hashing can be found here Perceptual hashing, https://en.wikipedia.org/w/ index.php?title=Perceptual_hashing&oldid=999157579 (last visited Jan. 25, 2021), which is incorporated by reference as if fully set forth herein.

Figure 10:
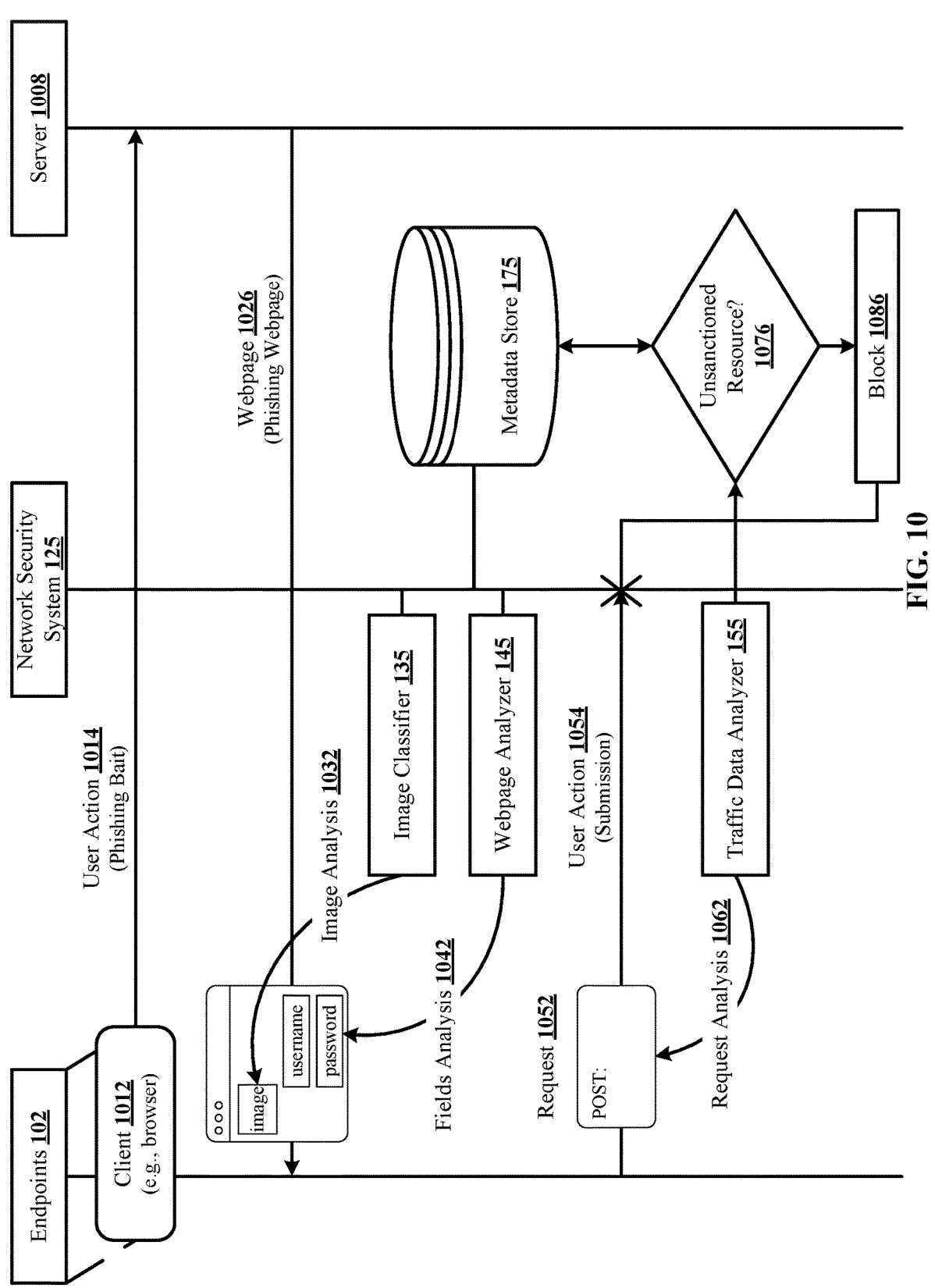
FIG. 10 is a message flow chart depicting some of the actions involved in the network security system detecting and preventing the phishing attacks.

FIG. 10 is a message flow chart depicting some of the actions involved in the network security system detecting and preventing the phishing attacks. The message flow chart can be implemented at least partially with a database system, e.g., by one or more processors configured to receive or retrieve information, process the information, store results, and transmit the results. Other implementations may perform the actions in different orders and/or with different, fewer, or additional actions than the ones illustrated in FIG. 10. Multiple actions can be combined in some implementations. For convenience, this message flow chart is described with reference to the system that carries out a method. The system is not necessarily part of the method.

Communications between the endpoints 102 and the server 1008 are monitored and mediated by the network security system 125 that is interposed in between them.

First, a user issues user action 1014 via a client 1012 (e.g., browser) running on the endpoints 102. In one implementation, the user action 1014 is selection of a hyperlink that serves as a phishing bait.

In response to the user action 1014, the server 1008 sends toward the client 1012 a phishing webpage 1026.

Then, the image classifier 135 of the network security system 125 performs image analysis 1032 of images of the phishing webpage 1026 and identifies a particular hosted service represented by the images.

Then, the webpage analyzer 145 of the network security system 125 performs field analysis 1042 of the fields of the phishing webpage 1026 and determines that the fields are eliciting confidential information.

Then, a user action 1054 attempts to submit the confidential information via the request 1052. The request 1052 is intercepted by the network security system 125 and not completed.

Then, the traffic data analyzer 155 of the network security system 125 performs request analysis 1062 of the request 1052 and determines that the confidential information is being exfiltrated to an unsanctioned resource or location. This determination is made by comparing 1076 a resource address in the request 1052 (e.g., POST URL) with one or more sanctioned resource addresses used by the particular hosted service, which are identified/listed in the metadata store 175 of the network security system 125.

Then, the network security system 125 determines that the phishing webpage is effectuating a phishing attack and blocks 1086 transmission of the confidential information to the unsanctioned resource.

In other implementations, if the comparison 1076 yields that the confidential information is being sent to a sanctioned resource or location, then the request is not blocked and instead fulfilled.

Figure 11:
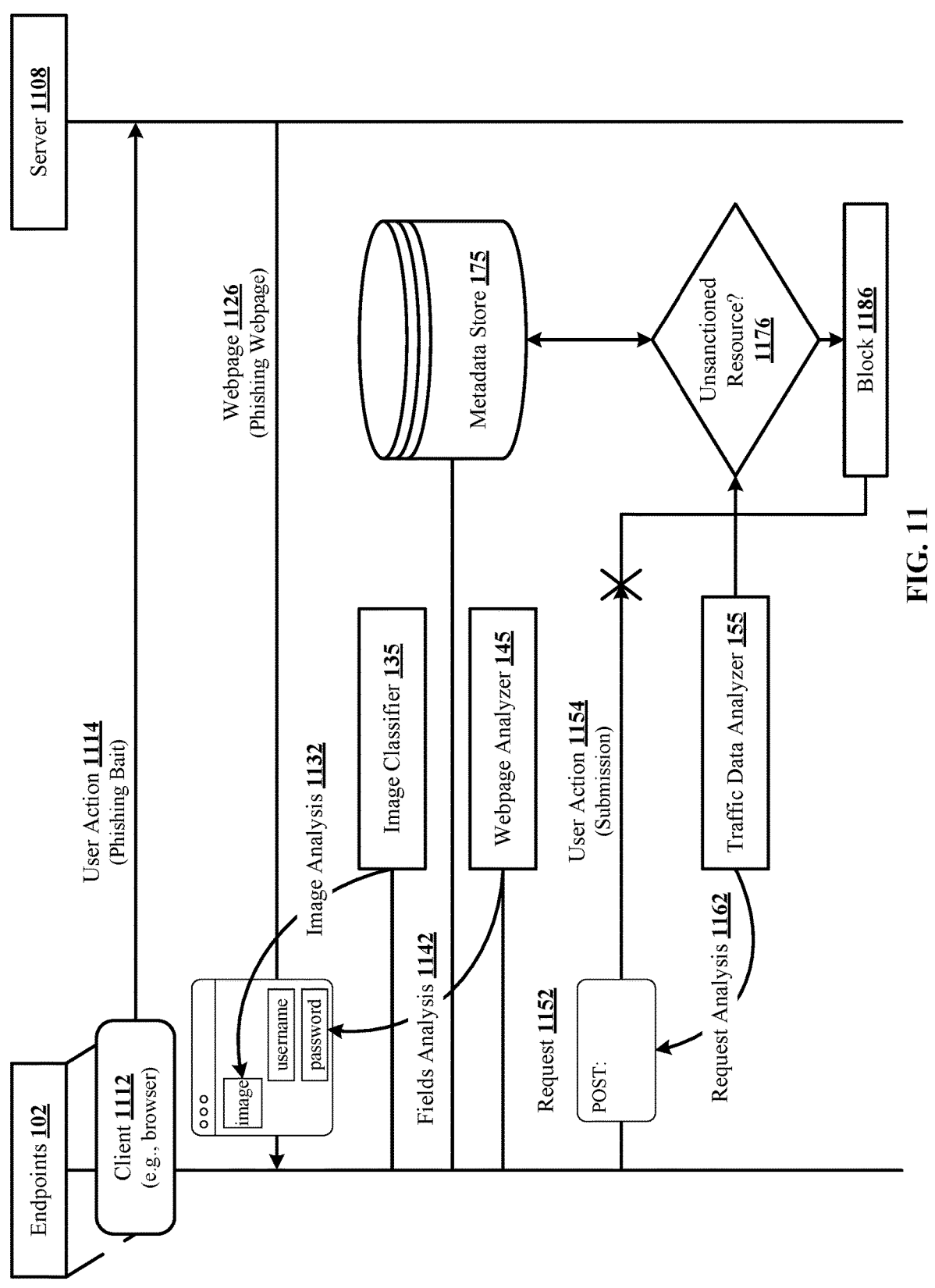
FIG. 11 is a message flow chart depicting some of the actions involved in the endpoint security system detecting and preventing the phishing attacks.

FIG. 11 is a message flow chart depicting some of the actions involved in the endpoint security system detecting and preventing the phishing attacks. The message flow chart can be implemented at least partially with a database system, e.g., by one or more processors configured to receive or retrieve information, process the information, store results, and transmit the results. Other implementations may perform the actions in different orders and/or with different, fewer or additional actions than the ones illustrated in FIG. 11. Multiple actions can be combined in some implementations. For convenience, this message flow chart is described with reference to the system that carries out a method. The system is not necessarily part of the method.

First, a user issues user action 1114 via a client 1112 (e.g., browser) running on the endpoints 102. In one implementation, the user action 1114 is selection of a hyperlink that serves as a phishing bait.

In response to the user action 1114, the server 1108 sends toward the client 1112 a phishing webpage 1126.

Then, the image classifier 135 of the endpoint security system 202 performs image analysis 1132 of images of the phishing webpage 1126 and identifies a particular hosted service represented by the images.

Then, the webpage analyzer 145 of the endpoint security system 202 performs field analysis 1142 of the fields of the phishing webpage 1126 and determines that the fields are eliciting confidential information.

Then, a user action 1154 attempts to submit the confidential information via the request 1152. The request 1152 is intercepted by the endpoint security system 202 and not completed.

Then, the traffic data analyzer 155 of the endpoint security system 202 performs request analysis 1162 of the request 1152 and determines that the confidential information is being exfiltrated to an unsanctioned resource or location. This determination is made by comparing 1176 a resource address in the request 1152 (e.g., POST URL) with one or more sanctioned resource addresses used by the particular hosted service, which are identified/listed in the metadata store 175 of the endpoint security system 202.

Then, the endpoint security system 202 determines that the phishing webpage is effectuating a phishing attack and blocks 1186 transmission of the confidential information to the unsanctioned resource.

In other implementations, if the comparison 1176 yields that the confidential information is being sent to a sanctioned resource or location, then the request is not blocked and instead fulfilled.

Figure 12:
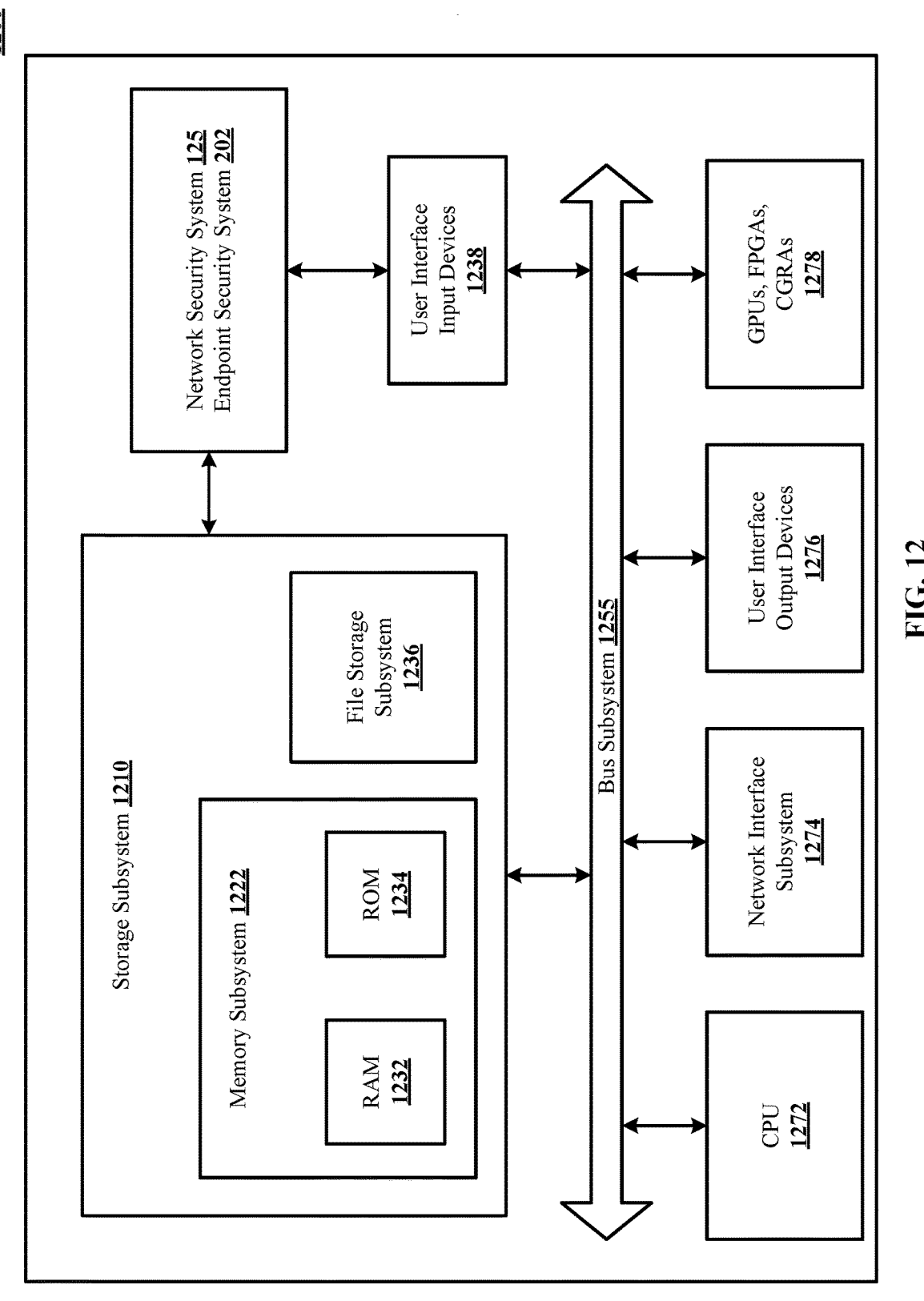
FIG. 12 is a simplified block diagram of a computer system that can be used to implement the technology disclosed.

FIG. 12 is a simplified block diagram of a computer system 1200 that can be used to implement the technology disclosed. Computer system 1200 includes at least one central processing unit (CPU) 1272 that communicates with a number of peripheral devices via bus subsystem 1255. These peripheral devices can include a storage subsystem 1210 including, for example, memory devices and a file storage subsystem 1236, user interface input devices 1238, user interface output devices 1276, and a network interface subsystem 1274. The input and output devices allow user interaction with the computer system 1200. Network interface subsystem 1274 provides an interface to outside networks, including an interface to corresponding interface devices in other computer systems.

In one implementation, the network security system 125 and/or the endpoint security system 202 are communicably linked to the storage subsystem 1210 and the user interface input devices 1238.

User interface input devices 1238 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into the computer system 1200.

User interface output devices 1276 can include a display subsystem, a printer, a fax machine, or non-visual displays such as audio output devices. The display subsystem can include an LED display, a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 1200 to the user or to another machine or computer system.

Storage subsystem 1210 stores programming and data constructs that provide the functionality of some or all of the modules and methods described herein. Subsystem 1278 can be graphics processing units (GPUs), field-programmable gate arrays (FPGAs), or coarse-grained reconfigurable architectures.

Memory subsystem 1222 used in the storage subsystem 1210 can include a number of memories including a main random access memory (RAM) 1232 for storage of instructions and data during program execution and a read only memory (ROM) 1234 in which fixed instructions are stored. A file storage subsystem 1236 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 1236 in the storage subsystem 1210, or in other machines accessible by the processor.

Bus subsystem 1255 provides a mechanism for letting the various components and subsystems of computer system 1200 communicate with each other as intended. Although bus subsystem 1255 is shown schematically as a single bus, alternative implementations of the bus subsystem can use multiple busses.

Computer system 1200 itself can be of varying types including a personal computer, a portable computer, a workstation, a computer terminal, a network computer, a television, a mainframe, a server farm, a widely-distributed set of loosely networked computers, or any other data processing system or user device. Due to the ever-changing nature of computers and networks, the description of computer system 1200 depicted in FIG. 12 is intended only as a specific example for purposes of illustrating the preferred embodiments of the present invention. Many other configurations of computer system 1200 are possible having more or less components than the computer system depicted in FIG. 12.

Particular Implementations

In one implementation, we disclose a computer-implemented method of detecting and preventing phishing attacks.

A network security system intercepts a webpage rendered by a server in response to a user action executed on a client. The network security system analyzes one or more images of the webpage and determines that a particular hosted service is represented by the images. The webpage is accompanied with a valid domain and certificate issued by the particular hosted service and impersonates one or more official webpages of the particular hosted service.

The network security system analyzes one or more fields of the webpage and determines that the fields elicit confidential information. The network security system intercepts a request generated by the client in response to another user action providing the confidential information via the fields.

The network security system analyses the request and determines that the confidential information is being exfiltrated to an unsanctioned resource. This determination is made by comparing a resource address in the request with one or more sanctioned resource addresses used by the particular hosted service.

The network security system determines that the webpage is effectuating a phishing attack and blocks transmission of the confidential information to the unsanctioned resource.

The method described in this section and other sections of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in these implementations can readily be combined with sets of base features identified in other implementations.

The particular hosted service can be a cloud computing and storage service and the webpage can be hosted on the cloud computing and storage service. The webpage can have a uniform resource locator (URL) of the cloud computing and storage service that is different from one or more official URLs of the particular hosted service.

The particular hosted service can be a website. The network security system can be configured with an image classifier that is trained to map webpage images to hosted services. In one implementation, the image classifier is a convolutional neural network (CNN).

The sanctioned resource addresses used by the particular hosted service can be identified in a metadata store maintained at the network security system. The sanctioned resource addresses can be identified by at least one of domain names, subdomain names, uniform resource identifiers (URIs), and URLs. The sanctioned resource addresses can be identified by at least one of Internet Protocol (IP) addresses, server name indications (SNIs), and subject alternative names (SANs).

The request can include a Hypertext Transfer Protocol (HTTP) header and the resource address can be identified in a POST field of the HTTP header. The request can include a HTTP header and the resource address can be identified in a referrer field of the HTTP header.

The fields that elicit confidential information can be username and password authentication fields, PHI fields, and/or PCI fields.

Other implementations of the method described in this section can include a non-transitory computer readable storage medium storing instructions executable by a processor to perform any of the methods described above. Yet another implementation of the method described in this section can include a system including memory and one or more processors operable to execute instructions, stored in the memory, to perform any of the methods described above.

In another implementation, we disclose a computer-implemented method of detecting and preventing phishing attacks.

An endpoint security system intercepts a webpage rendered by a server in response to a user action executed on a client. The endpoint security system analyzes one or more images of the webpage and determines that a particular hosted service is represented by the images. The webpage is accompanied with a valid domain and certificate issued by the particular hosted service and impersonates one or more official webpages of the particular hosted service.

The endpoint security system analyzes one or more fields of the webpage and determines that the fields elicit confidential information. The endpoint security system intercepts a request generated by the client in response to another user action providing the confidential information via the fields.

The endpoint security system analyses the request and determines that the confidential information is being exfiltrated to an unsanctioned resource. This determination is made by comparing a resource address in the request with one or more sanctioned resource addresses used by the particular hosted service.

The endpoint security system determines that the webpage is effectuating a phishing attack and blocks transmission of the confidential information to the unsanctioned resource.

The method described in this section and other sections of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in these implementations can readily be combined with sets of base features identified in other implementations.

The particular hosted service can be a cloud computing and storage service and the webpage can be hosted on the cloud computing and storage service. The webpage can have a uniform resource locator (URL) of the cloud computing and storage service that is different from one or more official URLs of the particular hosted service.

The particular hosted service can be a website. The endpoint security system can be configured with an image classifier that is trained to map webpage images to hosted services. In one implementation, the image classifier is a convolutional neural network (CNN).

The sanctioned resource addresses used by the particular hosted service can be identified in a metadata store maintained at the endpoint security system. The sanctioned resource addresses can be identified by at least one of domain names, subdomain names, uniform resource identifiers (URIs), and URLs. The sanctioned resource addresses can be identified by at least one of Internet Protocol (IP) addresses, server name indications (SNIs), and subject alternative names (SANs).

The request can include a Hypertext Transfer Protocol (HTTP) header and the resource address can be identified in a POST field of the HTTP header. The request can include a HTTP header and the resource address can be identified in a referrer field of the HTTP header.

The fields that elicit confidential information can be username and password authentication fields, PHI fields, and/or PCI fields.

Other implementations of the method described in this section can include a non-transitory computer readable storage medium storing instructions executable by a processor to perform any of the methods described above. Yet another implementation of the method described in this section can include a system including memory and one or more processors operable to execute instructions, stored in the memory, to perform any of the methods described above.

CLAUSES

We disclose the following clauses:

1. A computer-implemented method of machine learning-based data loss prevention (DLP), the method including:
   providing input characterizing content to a machine learning model trained to determine whether the content is sensitive or not sensitive;
   processing the input through the machine learning model and translating analysis by the machine learning model into an alternative representation of the input; and
   processing the alternative representation through an output layer and classifying the content as sensitive or not sensitive.

2. The computer-implemented method of clause 1, wherein the content is image data, and the machine learning model is a convolutional neural network (CNN).

3. The computer-implemented method of clause 1, wherein the content is text data, and the machine learning model is a recurrent neural network (RNN).

4. The computer-implemented method of clause 1, wherein the content is text data, and the machine learning model is an attention-based neural network (e.g., Transformer, Bert).

5. The computer-implemented method of clause 1, wherein the machine learning model is trained on training examples that are signatures of sensitive content and annotated with sensitive ground truth label for training.

6. The computer-implemented method of clause 1, wherein the machine learning model is trained on training examples that are signatures of non-sensitive content and annotated with non-sensitive ground truth label for training.

7. A computer-implemented method of machine learning-based threat detection, the method including:
   providing input characterizing a potential threat signature to a machine learning model trained to determine whether the potential threat signature is malicious or not malicious;
   processing the input through the machine learning model and translating analysis by the machine learning model into an alternative representation of the input; and
   processing the alternative representation through an output layer and classifying the potential threat signature as malicious or not malicious.

8. The computer-implemented method of clause 7, wherein the potential threat signature is image data, and the machine learning model is a convolutional neural network (CNN).

9. The computer-implemented method of clause 7, wherein the potential threat signature is text data, and the machine learning model is a recurrent neural network (RNN).

10. The computer-implemented method of clause 7, wherein the potential threat signature is text data, and the machine learning model is an attention-based neural network (e.g., Transformer, Bert).

11. The computer-implemented method of clause 7, wherein the machine learning model is trained on training examples that are signatures of real threats and annotated with malicious ground truth label for training.

12. The computer-implemented method of clause 7, wherein the machine learning model is trained on training examples that are signatures of fake threats and annotated with non-malicious ground truth label for training.

13. A computer-implemented method of machine learning-based threat detection, the method including:
   providing input characterizing a potential threat signature to a machine learning model trained to determine whether the potential threat signature is of a first threat type or a second threat type;
   processing the input through the machine learning model and translating analysis by the machine learning model into an alternative representation of the input; and
   processing the alternative representation through an output layer and classifying the potential threat signature as the first threat type or the second threat type.

14. The computer-implemented method of clause 13, wherein the potential threat signature is image data, and the machine learning model is a convolutional neural network (CNN).

15. The computer-implemented method of clause 13, wherein the potential threat signature is text data, and the machine learning model is a recurrent neural network (RNN).

16. The computer-implemented method of clause 13, wherein the potential threat signature is text data, and the machine learning model is an attention-based neural network (e.g., Transformer, Bert).

17. The computer-implemented method of clause 13, wherein the machine learning model is trained on training examples that are signatures of the first threat type and annotated with first threat type ground truth label for training.

18. The computer-implemented method of clause 13, wherein the machine learning model is trained on training examples that are signatures of the second threat type and annotated with second threat type ground truth label for training.

19. The computer-implemented method of clause 13, further including:

providing input characterizing a potential threat signature to a machine learning model trained to determine whether the potential threat signature is of the first threat type, the second threat type, or a third threat type;

processing the input through the machine learning model and translating analysis by the machine learning model into an alternative representation of the input; and processing the alternative representation through an output layer and classifying the potential threat signature as the first threat type, the second threat type, or the third threat type.

20. The computer-implemented method of clause 19, wherein the machine learning model is trained on training examples that are signatures of the third threat type and annotated with third threat type ground truth label for training.

21. A computer-implemented method of machine learning-based classification of cloud applications (hosted services), the method including:

providing input characterizing content to a machine learning model trained to determine which cloud application the content identifies from among a plurality of cloud applications (e.g., Box, Google Drive, Gmail, Office365, Outlook, Word, Excel, Dropbox, etc.);

processing the input through the machine learning model and translating analysis by the machine learning model into an alternative representation of the input; and processing the alternative representation through an output layer and classifying the content as identifying a particular cloud application from among the plurality of cloud applications.

The method described in this section and other sections of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in these implementations can readily be combined with sets of base features identified in other implementations.

Other implementations of the method described in this section can include a non-transitory computer readable storage medium storing instructions executable by a processor to perform any of the methods described above. Yet another implementation of the method described in this section can include a system including memory and one or more processors operable to execute instructions, stored in the memory, to perform any of the methods described above.

While the technology disclosed is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the innovation and the scope of the following claims.

What is claimed is:

1. A computer-implemented method of detecting and preventing phishing attacks, the method comprising:

intercepting, by a security system, a webpage rendered by a server in response to a first user action executed on a client device;

analyzing, by the security system, one or more images of the webpage and determining that the webpage is hosted by a particular hosted service represented by the one or more images, wherein the webpage is accompanied with a valid domain and certificate issued by the particular hosted service and impersonates one or more official webpages of the particular hosted service;

analyzing, by the security system, one or more fields of the webpage and determining that the one or more fields elicit confidential information;

intercepting, by the security system, a request generated by the client in response to a second user action providing the confidential information via the one or more fields, wherein the request comprises uploading the confidential information to a resource address different than a Uniform Resource Locator (URL) of the webpage;

identifying, by the security system, the resource address from the request; and in response to determining the resource address is not a sanctioned resource address of one or more sanctioned resource addresses associated with the particular hosted service, performing, by the security system, a security action based on a security policy, wherein the security action comprises quarantining the confidential information and initiating a workflow to remediate.

2. The computer-implemented method of claim 1, further comprising:

analyzing, by the security system, the request, the analyzing comprising:

identifying the confidential information and the resource address by parsing a header of the request;

identifying the one or more sanctioned resource addresses associated with the particular hosted service;

comparing substrings of the resource address with substrings of the one or more sanctioned resource addresses; and determining, based on the comparing, that the resource address is not one of the one or more sanctioned resource addresses.

3. The computer-implemented method of claim 1, wherein:

the particular hosted service is a cloud storage service; and the webpage is hosted on the cloud storage service.

4. The computer-implemented method of claim 1, wherein the confidential information comprises:

controlled unclassified information;

personally identifiable information;

protected health information;

payment card industry (PCI) information;

social security number;

driver license information;

biometric information;

password; or a combination thereof.

5. The computer-implemented method of claim 1, wherein the security action further comprises:

blocking transmission of the confidential information to the resource address;

sending an alert to an administrator of the security system;

holding transmission of the confidential information to the resource address;

providing a coaching message to a display of the client device and holding transmission of the confidential information to the resource address;

encrypting the confidential information; or a combination thereof.

6. The computer-implemented method of claim 1, wherein the analyzing the one or more images of the webpage comprises:

submitting the one or more images to an image classifier trained to map webpage images to hosted services; and receiving an output from the image classifier indicating the particular hosted service is mapped to the one or more images.

7. The computer-implemented method of claim 6, wherein the image classifier is a convolutional neural network (CNN).

8. The computer-implemented method of claim 1, wherein the one or more sanctioned resource addresses associated with the particular hosted service are identified in a metadata store.

9. The computer-implemented method of claim 1, wherein the one or more sanctioned resource addresses are identified by:

domain names;

subdomain names;

uniform resource identifiers (URIs);

URLs; or a combination thereof.

10. The computer-implemented method of claim 1, wherein the one or more sanctioned resource addresses are identified by:

Internet Protocol (IP) addresses;

server name indications (SNIs);

subject alternative names (SANs); or a combination thereof.

11. The computer-implemented method of claim 1, wherein:

the request comprises a Hypertext Transfer Protocol (HTTP) header; and the resource address is identified in a POST field of the HTTP header.

12. The computer-implemented method of claim 1, wherein:

the request comprises a HTTP header; and the resource address is identified in a referer field of the HTTP header.

13. The computer-implemented method of claim 1, wherein the security system is implemented in a cloud-based network security system.

14. The computer-implemented method of claim 1, wherein the security system is implemented in an endpoint security system.

15. A security system for detecting and preventing phishing attacks, the system comprising:

one or more processors; and one or more memories having stored thereon instructions that, upon execution by the one or more processors, cause the one or more processors to:

intercept a webpage rendered by a server in response to a first user action executed on a client device;

analyze one or more images of the webpage and determining that the webpage is hosted by a particular hosted service represented by the one or more images, wherein the webpage is accompanied with a valid domain and certificate issued by the particular hosted service and impersonates one or more official webpages of the particular hosted service;

analyze one or more fields of the webpage and determining that the one or more fields elicit confidential information;

intercept a request generated by the client in response to a second user action providing the confidential information via the one or more fields, wherein the request comprises uploading the confidential information to a resource address different than a Uniform Resource Locator (URL) of the webpage;

identify the resource address from the request; and in response to determining the resource address is not a sanctioned resource address of one or more sanctioned resource addresses associated with the particular hosted service, perform a security action based on a security policy, wherein the security action comprises quarantining the confidential information and initiating a workflow to remediate.

16. The security system of claim 15, further comprising:

a metadata store comprising the one or more sanctioned resource addresses.

17. The security system of claim 15, further comprising:

a convolutional neural network trained to map webpage images to hosted services;

wherein the instructions to analyze the one or more images of the webpage comprises further instructions that, upon execution by the one or more processors, cause the one or more processors to:

submit the one or more images to the convolutional neural network; and receive an output from the convolutional neural network indicating the particular hosted service is mapped to the one or more images.

18. The security system of claim 15, wherein the instructions comprise further instructions that, upon execution by the one or more processors, cause the one or more processors to:

analyze the request, the analyzing comprising:

identifying the confidential information and the resource address by parsing a header of the request;

identifying the one or more sanctioned resource addresses associated with the particular hosted service;

comparing substrings of the resource address with substrings of the one or more sanctioned resource addresses; and determining, based on the comparing, that the resource address is not one of the one or more sanctioned resource addresses.

19. The security system of claim 15, wherein the instructions to perform the security action comprise further instructions that, upon execution by the one or more processors, cause the one or more processors to:

block transmission of the confidential information to the resource address;

send an alert to an administrator of the security system;

hold transmission of the confidential information to the resource address;

provide a coaching message to a display of the client device and hold transmission of the confidential information to the resource address;

encrypt the confidential information; or a combination thereof.

20. The security system of claim 15, wherein the instructions to analyze the one or more fields of the webpage comprise further instructions that, upon execution by the one or more processors, cause the one or more processors to:

parsing the webpage to identify key-value pairs based on text associated with fields of the one or more fields; and performing lexical and syntax analysis of the key-value pairs.

* * * * *